US009822216B2

(12) United States Patent
Mahanthappa et al.

(10) Patent No.: US 9,822,216 B2
(45) Date of Patent: Nov. 21, 2017

(54) MICROPHASE SEPARATION OF BLOCK COPOLYMER BOTTLEBRUSHES

(71) Applicant: Wisconsin Alumni Research Foundation, Madison, WI (US)

(72) Inventors: Mahesh Kalyana Mahanthappa, Edina, MN (US); Frank W. Speetjens, Lihue, HI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/809,076

(22) Filed: Jul. 24, 2015

(65) Prior Publication Data

US 2016/0024246 A1 Jan. 28, 2016

Related U.S. Application Data

(60) Provisional application No. 62/029,308, filed on Jul. 25, 2014.

(51) Int. Cl.
   *C08G 63/08* (2006.01)
   *C08F 293/00* (2006.01)
   *C08F 290/06* (2006.01)

(52) U.S. Cl.
   CPC .......... *C08G 63/08* (2013.01); *C08F 290/061* (2013.01); *C08F 293/005* (2013.01); *C08F 2438/01* (2013.01)

(58) Field of Classification Search
   CPC .............. C08F 290/061; C08F 293/005; C08F 2438/01; C08G 63/08
   See application file for complete search history.

(56) References Cited

PUBLICATIONS

Morandi, D. Le, G., et al. "Cyclobutenyl Macromonomers: Synthetic Strategies and Ring-Opening Metathesis Polymerization," *European Polymer Journal*, vol. 49, 2013 pp. 972-983.
Baruth, A., "Optimization of Long-Range Order in Solvent Vapor Annealed Poly(styrene)-block-poly(lactide) Thin Films for Nanolithography," *Chemical Society*, 2014, 12 pages.
Zalusky, Andrew S., "Ordered Nanoporous Polymers from Polystyrene-Polylactide Block Copolymers," 2002 American Chemical Society, *J. Am. Chem. Soc.* 2002, vol. 124, pp. 12761-12773.
Keen, Imelda, et al., "Control of the Orientation of Symmetric Poly(styrene)-blockpoly(D,L-lactide) Block Copolymers Using Statistical Copolymers of Dissimilar Composition," *Langmuir*, 2012, vol. 28, pp. 15876-15888.
Wu, Lifeng, "Consequences of Block Number on the Order-Disorder Transition and Viscoelastic Properties of Linear (AB)n Multiblock Copolymers," *Macromolecules* 2004, vol. 37, pp. 3360-3368.
Olayo-Valles, Roberto, et al. "Perpendicular Domain Orientation in Thin Films of Polystyrene-Polylactide Diblock Copolymers," *Macromolecules* 2005, vol. 38, pp. 10101-10108.
Xie, Meiran, et al., "Well-Defined Brush Copolymers with High Grafting Density of Amphiphilic Side Chains by Combination of ROP, ROMP, and ATRP," *Macromolecules*, 2008, vol. 41, pp. 9004-9010.
Li, Changhua, et al., "Synthesis and Self-Assembly of Coil-Rod Double Hydrophilic Diblock Copolymer with Dually Responsive Asymmetric Centipede-Shaped Polymer Brush as the Rod Segment," *Macromolecules*, 2009, vol. 42, pp. 2916-2924.
Li, Yukun, et al., "Facile Synthesis and Visualization of Janus Double-Brush Copolymers," *ACS Macro Lett.*, 2012, 1, pp. 52-56.
Buzza, D.M.A., et al., "Anomalous Difference in the Order-Disorder Transition Temperature Comparing a Symmetric Diblock Copolymer AB with its Hetero-Four-Arm Star Analog $A_2B_2$," *Macromolecules*, Oct. 12, 1999, vol. 32, pp. 7483-7495.
Hou, Chengmin, et al., "Synthesis and Bulk Self-Assembly of Well-Defined Binary Graft Copolymers," American Chemical Society, *Macromolecules* 2013, vol. 46, pp. 4053-4063.
Sinturel, Christophe, et al., Structural Transitions in Asymmetric Poly(styrene)-block-Poly(lactide) Thin Films Induced by Solvent Vapor Exposure, American Chemical Society, *ACS Appl. Mater. Interfaces*, Jul. 7, 2014, vol. 6, pp. 12146-12152.
Stein, Gila E., et al., "Controlling Interfacial Interactions for Directed Self Assembly of Block Copolymers," *Journal of Polymer Science*, Part B: Polymer Physics, 2015, vol. 53, pp. 96-102.

*Primary Examiner* — Irina S Zemel
*Assistant Examiner* — Jeffrey Lenihan
(74) *Attorney, Agent, or Firm* — Weaver Austin Villeneuve & Sampson LLP

(57) ABSTRACT

Provided herein are microphase-separated materials including a plurality of block copolymers tethered together at their A-B junction points. The tethered-together block copolymers, referred to as a block copolymer bottlebrush, provide microphase-separated materials having smaller domain spacing than previously achievable using block copolymer systems.

15 Claims, 17 Drawing Sheets

$A_2B$ block copolymer bottlebrush 26

$n$ tethered $A_2B$ block copolymers $A_2B_2$ block copolymer bottlebrush 28

$n$ tethered $A_2B_2$ block copolymers

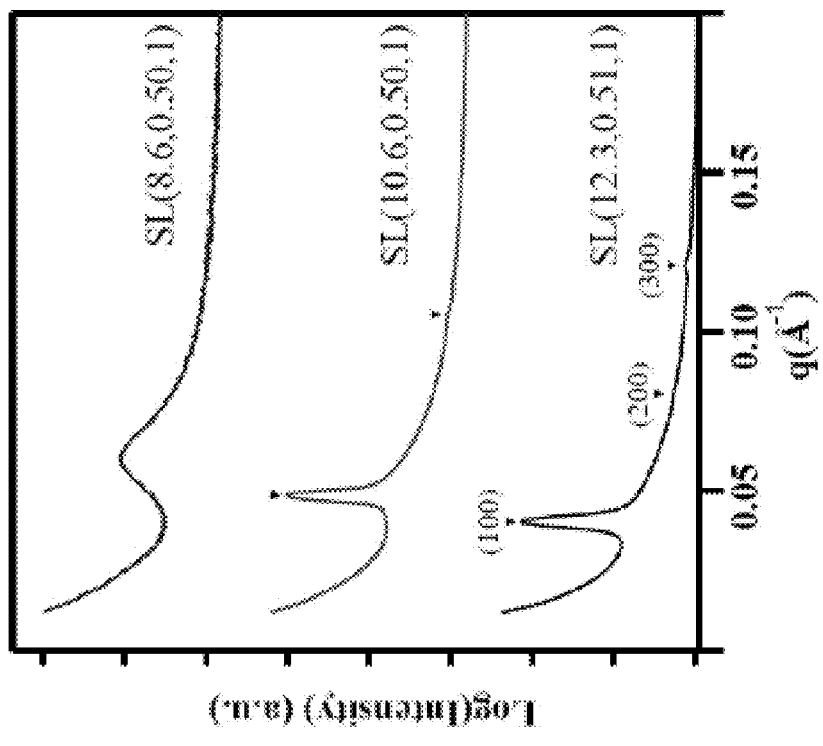
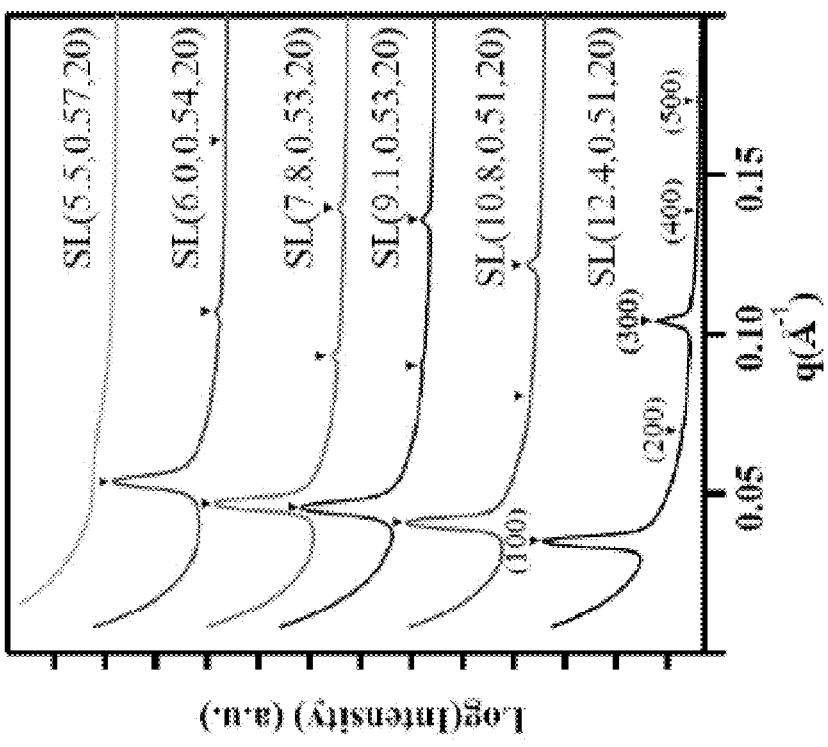
*Figure 3B*
*Figure 3A*

MICROPHASE SEPARATION OF BLOCK COPOLYMER BOTTLEBRUSHES

CROSS-REFERENCE TO RELATED APPLICATION

This application claims the benefit of priority of U.S. Provisional Patent Application No. 62/029,308, filed Jul. 25, 2014, and titled "MICROPHASE SEPARATION OF BLOCK COPOLYMER BOTTLEBRUSHES," all of which is incorporated herein by reference in its entirety and for all purposes.

STATEMENT OF GOVERNMENT SUPPORT

This invention was made with government support under 0832760 awarded by the National Science Foundation. The government has certain rights in the invention.

BACKGROUND OF THE INVENTION

Advanced nanoscale science and engineering have driven the fabrication of two-dimensional and three-dimensional structures with nanometer precision for various applications including electronics, photonics and biological engineering. However, traditional patterning methods such as photolithography and electron beam lithography that have emerged from the microelectronics industry are limited in the features that can be formed as critical dimensions decrease.

SUMMARY

In one aspect, embodiments disclosed herein include composition having a block copolymer bottlebrush material, with the block copolymer bottlebrush having a plurality of block copolymers covalently linked at an A-B junction. The material is microphase-separated into domains of the A and B polymers. The domain size may be smaller than the minimum domain size of a microphase-separated AB diblock copolymer material. In some embodiments, the domain size is at least 25% smaller than the domain size of the AB diblock copolymer. The block copolymer bottlebrush material may be in a thin film or a bulk-phase material. In some embodiments, the domains of the block copolymer bottlebrush material are oriented perpendicular to an underlying substrate. According to various embodiments, the plurality of block copolymers may be symmetric or asymmetric AB diblock copolymers. In some embodiments, the plurality of block copolymers may be $A_2B$ block copolymers or $A_2B_2$ block copolymers. The composition may exhibit various morphologies including perpendicular or parallel lamellar, cylindrical, or sphere-forming morphologies.

In another aspect, embodiments disclosed herein include a microphase-separated block copolymer material having a plurality of AB diblock copolymers characterized by the segmental interaction parameter $\chi_{AB}$, where the AB diblock copolymers in the microphase-separated material have an average degree of polymerization $N_n$ such that $\chi_{AB}N_n$ is less than 7.5. In some embodiments, the AB diblock copolymers in the microphase-separated material have an average degree of polymerization $N_n$ such that $\chi_{AB}N_n$ is less than 5. In some embodiments, the AB diblock copolymers in the microphase-separated material have an average degree of polymerization $N_n$ such that $\chi_{AB}N_n$ is less than 4.

In another aspect, embodiments disclosed herein include a microphase-separated block copolymer material having a plurality of AB diblock copolymers characterized by the segmental interaction parameter $\chi_{AB}$, where the AB diblock copolymers in the microphase-separated material have a lamellar spacing less than $3.8 \times 1.096 a_{AB}\chi^{-1/2}$. In some embodiments, the AB diblock copolymers in the microphase-separated material have a lamellar spacing less than $3 \times 1.096 a_{AB}\chi^{-1/2}$.

In yet another aspect, embodiments disclosed herein include methods of depositing a block copolymer bottlebrush material on a substrate, where the block copolymer bottlebrush includes a plurality of block copolymers covalently linked at an A-B junction; and inducing self-assembly of the block copolymer bottlebrush such that the material is microphase-separated into domains of the A and B polymers. In some embodiments, the domains of the A and B polymers are oriented perpendicularly to the substrate. The methods may further include selectively removing the domains of one of the A polymer or the B polymer. In some embodiments, the methods may involve transferring the pattern of the microphase-separated domains to the substrate or to a second substrate.

BRIEF DESCRIPTION OF THE DRAWINGS

FIGS. 3A and 3B show small angle X-ray scattering (SAXS) patterns for a series of PS-b-PLA block copolymer bottlebrushes with $N_{n,backbone}=20$ (FIG. 3A) and a series of PS-b-PLA diblock copolymers ($N_{n,backbone}=1$) (FIG. 3B) with markers indicating the calculated peak positions for a lamellar morphology.

DETAILED DESCRIPTION

Reference will now be made in detail to various implementations of the disclosure herein. Examples of the specific embodiments are illustrated in the accompanying drawings. While the disclosure will be described in conjunction with these specific embodiments, it will be understood that it is not intended to limit the disclosure to such specific embodiments. On the contrary, it is intended to cover alternatives, modifications, and equivalents as may be included within the spirit and scope of the disclosure. In the following description, numerous specific details are set forth in order to provide a thorough understanding of the disclosure. Various implementations may be practiced without some or all of these specific details. In other instances, well known process operations have not been described in detail in order not to unnecessarily obscure the disclosure.

Provided herein are microphase-separated materials including a plurality of AB diblock copolymers tethered together at their A-B junction points. The tethered-together diblock copolymers, referred to as block copolymer bottlebrush, provide microphase-separated materials having smaller domain spacing than previously achievable using block copolymer systems.

Bottlebrush polymers are copolymers having polymeric side chains (also referred to as "arms") grafted onto a polymeric backbone. Block copolymers are a class of polymers that have two or more polymeric blocks. A diblock copolymer, for example, has two blocks. The structure of a linear AB diblock copolymer may correspond, for example, to AAAAAAA-BBBBBBBB.

Figure 1A:
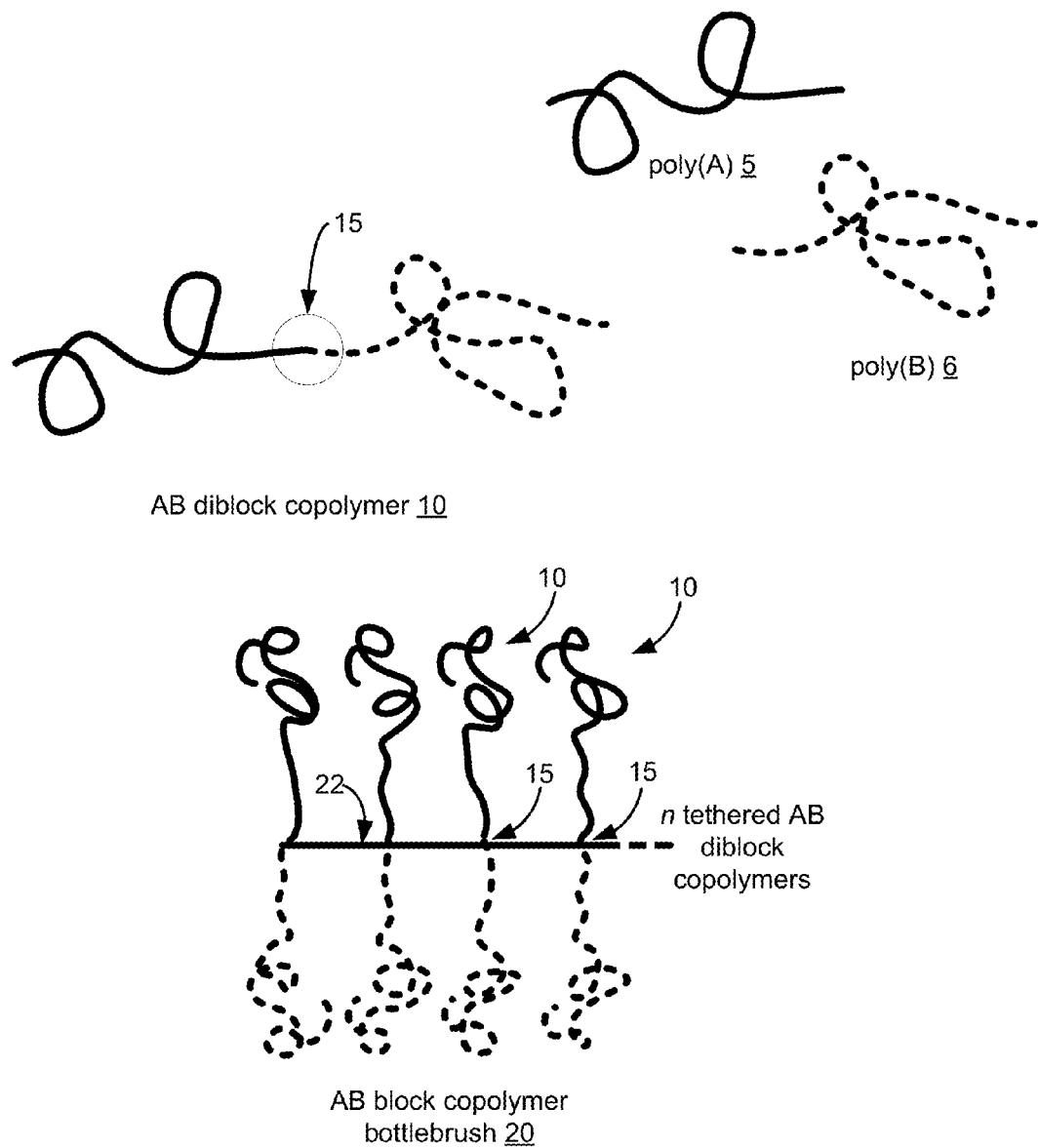
FIG. 1A is a schematic illustration of an example of an AB block copolymer bottlebrush.

As used herein, the term "block copolymer bottlebrush" refers to a compound having a backbone with a plurality of $A_nB_m$ star block copolymers covalently linked to the backbone at the A-B junction point wherein n≥1 and m≥1. As used herein, an $A_nB_m$ star block copolymer is a star polymer with n A blocks and m B blocks are attached at a junction point. These include AB diblock copolymers in the case where n and m are 1. Block copolymer bottlebrushes are distinct from bottlebrush copolymers, which have A and B polymers at different graft sites on a backbone. For example, a bottlebrush copolymer may have a series of A polymers grafted to the backbone, followed by a series of B polymers grafted to the backbone. In another example, a bottlebrush copolymer may have a bottlebrush of A polymers covalently linked to a bottlebrush of B polymers. Block copolymer bottlebrushes are also different from core-shell bottlebrushes, in which a plurality of AB block copolymers are covalently linked to the backbone through either terminus of the AB block copolymer. By contrast, a lamellar bottlebrush has at least one A block and at least one B block at the same graft site, typically at each graft site on the backbone. Common linear AB diblock copolymers (referred to herein as AB diblock copolymers) do not have a backbone. See FIG. 1A, which shows an example of an AB diblock copolymer (10) and a block copolymer bottlebrush having A and B blocks (20). The AB diblock copolymer 10 includes a homopolymer poly(A) (5) and a homopolymer poly(B) (6) joined at an A-B block junction 15 to form the AB diblock copolymer 10. The block copolymer bottlebrush 20 includes a backbone 22 with n tethered AB diblock copolymers 10 grafted to the backbone 22 at the A-B block junction 15 of each.

Figure 1B:
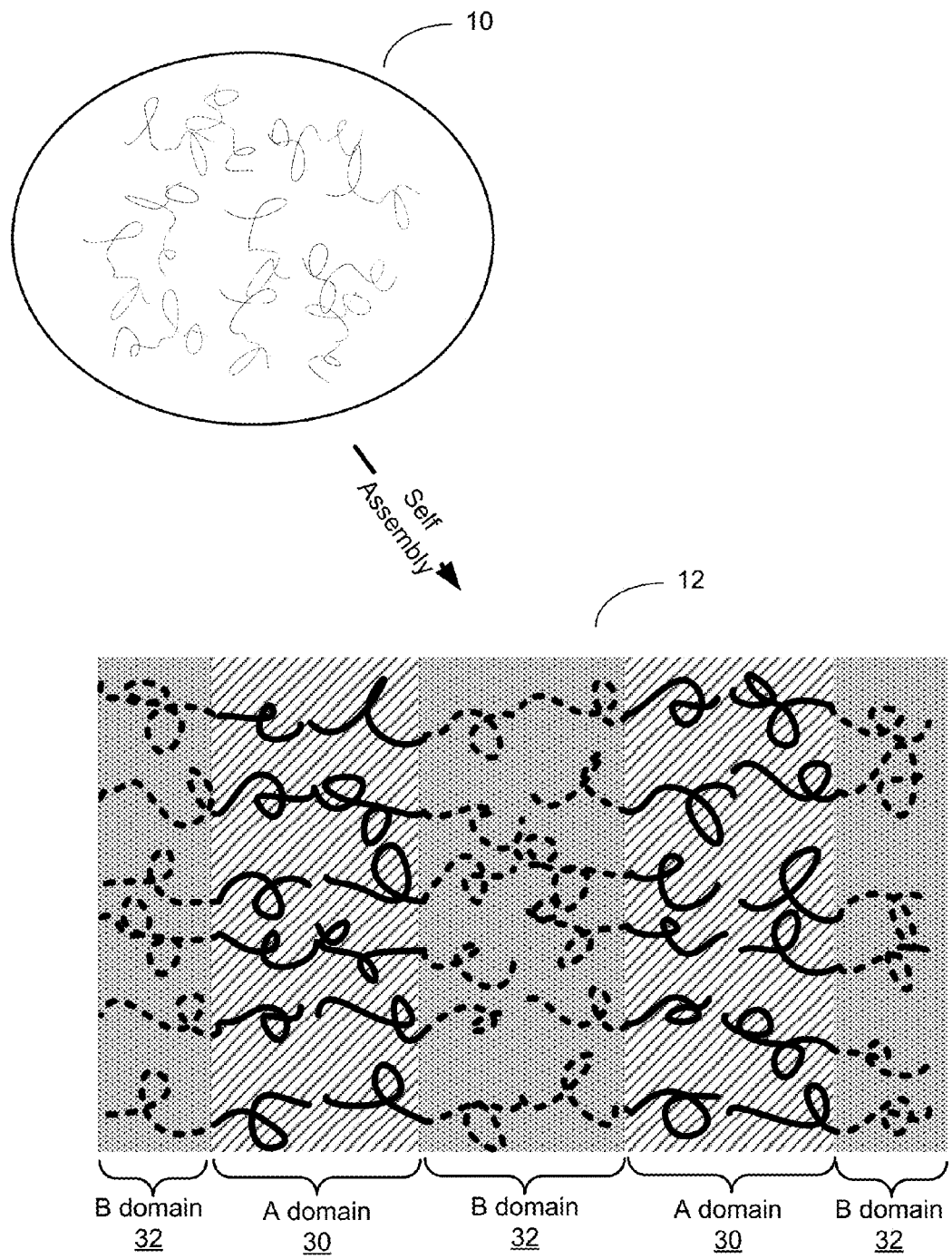
FIGS. 1B and 1C are schematic illustrations of an example of a microphase-separated material including tethered AB block copolymers (a block copolymer bottlebrush) (FIG. 1C) as compared to a microphase-separated material including non-tethered AB diblock copolymers (FIG. 1B).

At particular temperatures and compositions, block copolymers microphase separate into domains of different morphological features. For example, when the volume fraction f of either block is around 0.1, an AB diblock copolymer will microphase separate into spherical domains, where one block of the copolymer surrounds spheres of the other block. As the volume fraction of either block nears around 0.2-0.3, the blocks separate to form a hexagonal array of cylinders, where one block of the copolymer surrounds cylinders of the other block. And when the volume fractions of the blocks are approximately equal, lamellar domains (i.e., alternating stripes of the blocks) are formed. FIG. 1B shows a schematic example of AB diblock copolymers 10 self-assembled into a microphase-separated material 12 that includes A domains 30 and B domains 32.

One or more blocks of a microphase-separated block copolymer can be processed for various applications, including creating nanoscale templates for pattern transfer and forming functional features in the block copolymer material. While AB diblock copolymers readily self-assemble with domain spacings correlated to the degree of polymerization at periodicities of about 15 nm to 100 nm, advanced technological applications demand access to microphase-separated morphologies at ever decreasing domain spacings. Unfortunately, accessing smaller feature sizes in block copolymers is non-trivial due to there being a critical degree of polymerization necessary for microphase separation within the system.

AB diblock copolymer phase behavior is parameterized by: (1) the volume fractions $f_A$ and $f_B$ of the A and B blocks ($f_A=1-f_B$), and (2) the segregation strength, $\chi_{AB}N$, where N is the segment density-normalized degree of polymerization and $\chi_{AB}$ is the segmental interaction parameter, which quantifies the unfavorable interaction energy associated with A/B monomer contacts. Each block copolymer system has a minimum segregation strength below which microphase separation will not occur. This minimum segregation strength defines the order-disorder transition (ODT) and is referred to as $(\chi N)_{ODT}$.

The segmental interaction parameter $\chi_{AB}$ for a block copolymer is described in Kennemur et al., Macromolecules 2012, 45, 7228-7236, incorporated by reference herein in its entirety. The segmental interaction parameter $\chi_{AB}$ may also be referred to as the segment-segment interaction parameter, as in Kennemur et al. Temperature dependent $\chi_{AB}$ values for block copolymers may be determined as in Kennemur or found in various references as appropriate. For example, $\chi_{AB}$ values for various polymer pairs are disclosed in Cushen et al., Macromolecules 2012, 45, 8722-8728 and Cochran and Bates, Macromolecules 2002, 35, 7368-7374, both of which are incorporated by reference herein.

Mean-field theories, generally verified by experiment, predict an $(\chi_{AB}N)_{ODT}$ of 10.5 for AB diblock copolymer microphase separation when $f_A=f_B=0.50$. The lamellar microdomain spacing (d) for an AB diblock copolymer theoretically scales as $d \propto \chi_{AB}^{1/6}N^{2/3}$. Given this scaling relation and the requirement that $(\chi_{AB}N) \geq 10.5$ for microphase separation to occur, efforts to decrease the d-spacings afforded by block copolymers have centered on developing high $\chi_{AB}$ block copolymers that microphase separate at small values of N. While numerous high $\chi_{AB}$ diblock copolymer systems have been developed, these new chemistries require new materials processing strategies for their effective utilization.

Rather than focus on developing high $\chi_{AB}$ block copolymers that microphase separate at small values of N, the compositions and methods disclosed herein rely architecture of the block copolymers to achieve lower $(\chi N)_{ODT}$. The microphase-separated materials disclosed herein include block copolymers covalently linked at the interface of the microphase separated domains. The arms in the block copolymer bottlebrushes are able to microphase separate at degrees of polymerization less than half that of the comparative diblock copolymer, resulting in smaller domain sizes than previously achieved. For example, the domain spacing d of microphase-separated poly(styrene-block-lactide) block copolymer bottlebrushes having a lamellar morphology is over 25% reduced compared to the corresponding microphase-separated poly(styrene-block-lactide) diblock copolymer.

Figure 1C:
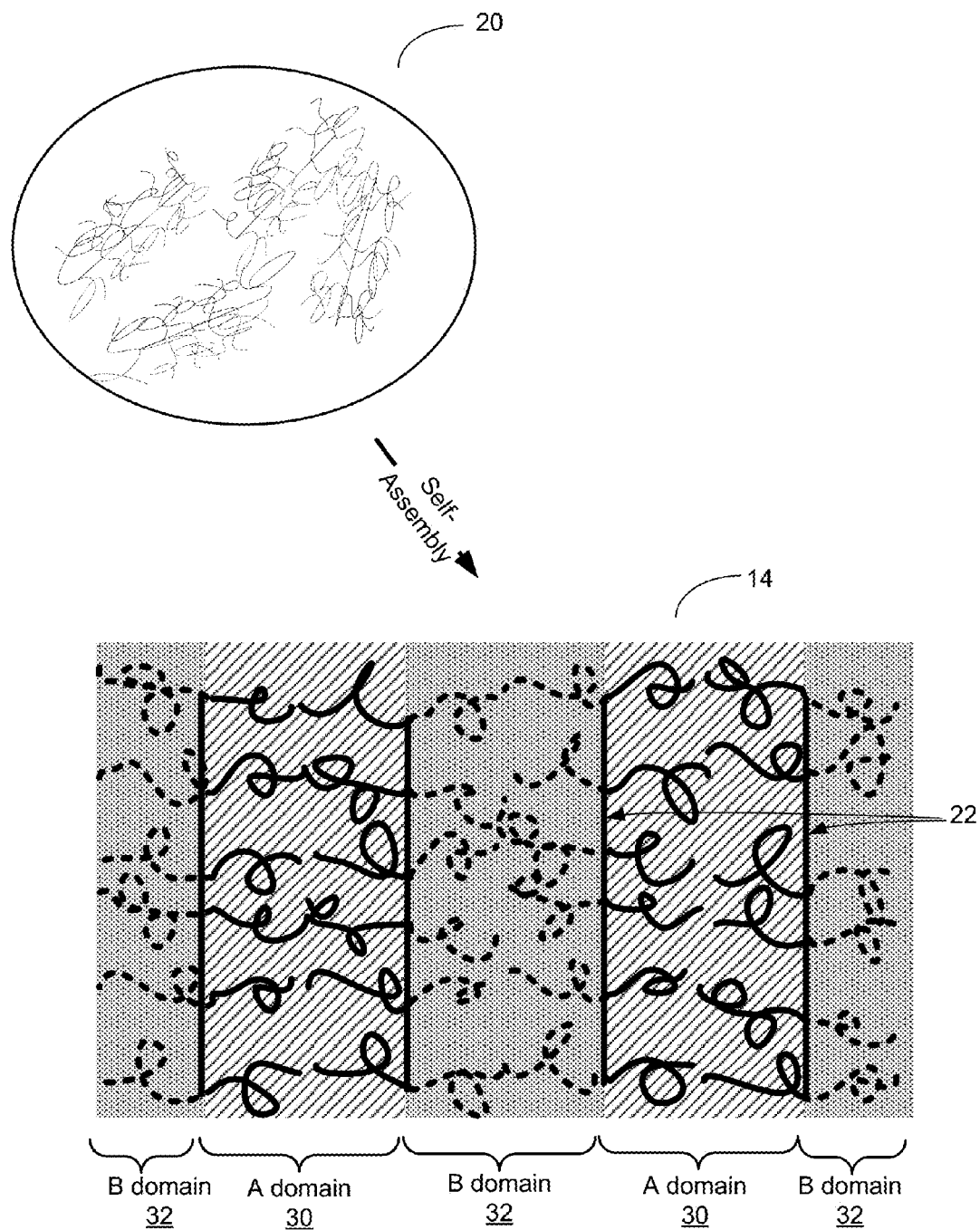

FIG. 1C shows a schematic example of AB block copolymer bottlebrushes 20 self-assembled into a microphase-separated material 14 that includes A domains 30 and B domains 32. The microphase-separated material 14 also includes a backbone 22 at each A/B domain interface. As discussed above with reference to FIG. 1A, each backbone 22 tethers AB diblock copolymers together at their block junctions. As discussed further below, microphase-separated block copolymer bottlebrush materials disclosed herein are able to achieve lower length scales than previously achieved for a particular block copolymer chemistry. This is due to a reduction in $(\chi_{AB}N)_{ODT}$ from 10.5 for diblock copolymers to around 3.0 for the block copolymer bottlebrushes.

The microphase-separated morphologies adopted by block copolymers reflect the delicate energetic balance between the unfavorable enthalpy of interaction between dissimilar homopolymer segments and the entropic penalty associated with chain stretching and supramolecular ordering. For low molecular weight block copolymers that form disordered melts, the entropy of the disordered copolymer chains outweighs the enthalpic gain associated with their supramolecular ordering into a microphase-separated morphology. Without being bound by a particular theory, it is believed that by tethering together disordered, low molecular weight AB diblock copolymers at their block junctions, the free energy balance is shifted in favor of microphase separation at reduced length scales.

The block copolymer bottlebrush may include any type of block copolymer that undergoes microphase separation under appropriate thermodynamic conditions. This includes block copolymers that have as components glassy polymers such as poly(styrene) and poly(methylmethacrylate), which have relatively high glass transition temperatures, as well as more elastomeric polymers such as poly(butadiene) and poly(dimethylsiloxane). The blocks may be conducting, semiconducting or insulating.

Examples of blocks include poly(styrene) (PS), poly(4-fluorostyrene) (P4FS), poly(butadiene) (PB), poly(isoprene) (PI), poly(methyl methacrylate) (PMMA), poly(lactic acid) (PLA), poly(ethylene oxide) (PEO), poly(dimethylsiloxane) (PDMS), poly(2-vinylpyridine) (P2VP), polyferrocenyldimethylsilane (PFDMS), poly(trimethylsilylstyrene) (PTMSS), and poly(cyclohexylethylene) (PCHE). As indicated above, in some implementations, a block copolymer having a well characterized post-processing is used. Examples include PS-b-PMMA, PS-b-PDMS, PS-b-PEO, and PS-b-PLA. In some implementations, a high $\chi_{AB}$ block copolymer is used. Examples include PTMSS-b-PLA, PCHE-b-PMMA, PB-b-PLA and PS-b-PEO.

The block copolymer bottlebrushes typically have at least one AB diblock copolymer at each graft site or monomer unit of the backbone. Each graft site is typically defined as a monomer unit (although multiple graft sites per monomer unit may be possible as discussed further below). However, there may be some graft sites that include an A homopolymer or a B homopolymer only, e.g., from an imperfect synthesis. For AB block copolymer bottlebrushes, most of the graft sites, and usually over 90%, will be at the block junction of an AB diblock copolymer.

Figure 1D:
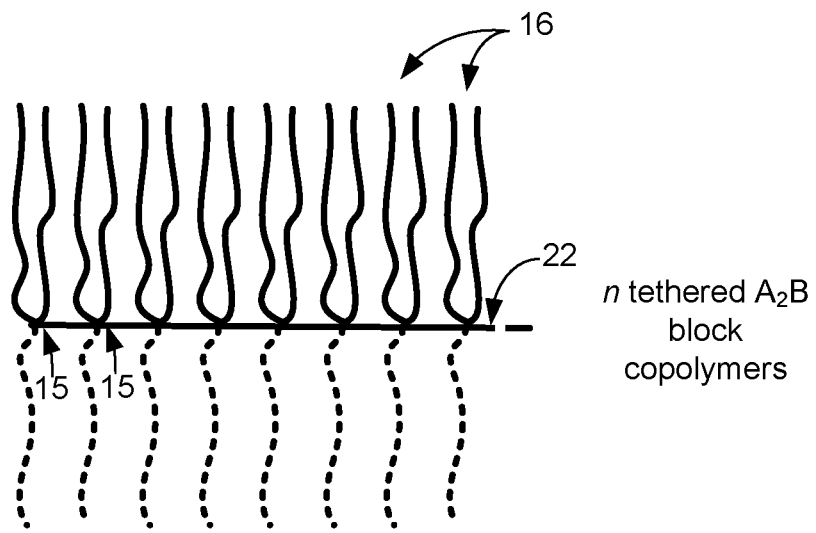
FIG. 1D shows schematic illustrations of examples of $A_2B$ block copolymer and $A_2B_2$ block copolymer bottlebrushes.
Figure 1D:
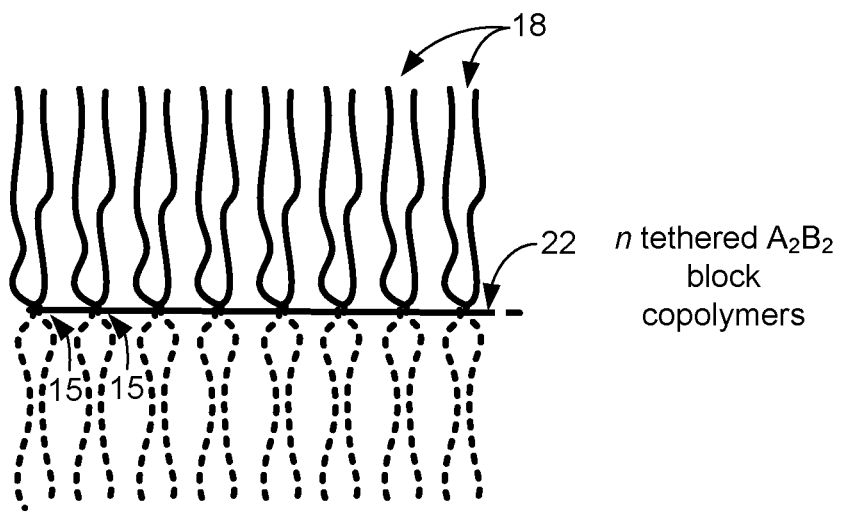

While the discussion herein refers chiefly to block copolymer bottlebrushes that have an AB diblock copolymer at each monomer unit, in some implementations, the monomer units of the bottlebrushes include star copolymers such as $A_2B$ block copolymer bottlebrushes and $A_2B_2$ block copolymer bottlebrushes. FIG. 1D shows examples of an $A_2B$ block copolymer bottlebrush 26 and an $A_2B_2$ block copolymer bottlebrush 28. The $A_2B$ block copolymer bottlebrush 26 includes n $A_2B$ block copolymers 16 tethered together by a backbone 22 at A-B block junctions 15. Similarly, the $A_2B_2$ block copolymer bottlebrush 28 includes n $A_2B_2$ block copolymers 18 tethered together by a backbone 22 at A-B block junctions 15.

The backbone of the block copolymer bottlebrush may be determined by the polymerization mechanism. For example, for ring-opening metathesis polymerization mechanisms, the backbone may be a polynorborene. In another example, for free radical polymerization mechanisms, the backbone may be a poly(acrylate), poly(methacrylate), or poly(styrene). The graft sites on the backbone may be generally uniformly spaced, though there may be some variation in spacing. The number of graft sites per backbone $N_{backbone}$ (as quantified, for example, by the number average $N_{n,backbone}$) is at least 2, and more typically at least 5. It should be noted that for many systems $N_{backbone}$ is the degree of polymerization or number of repeat units. For example, for AB diblock copolymer bottlebrushes $N_{backbone}$ is the degree of polymerization. However, there may be more than one graft site per monomer unit. The discussion below refers to $N_{backbone}$ as the degree of polymerization.

Figure 4:
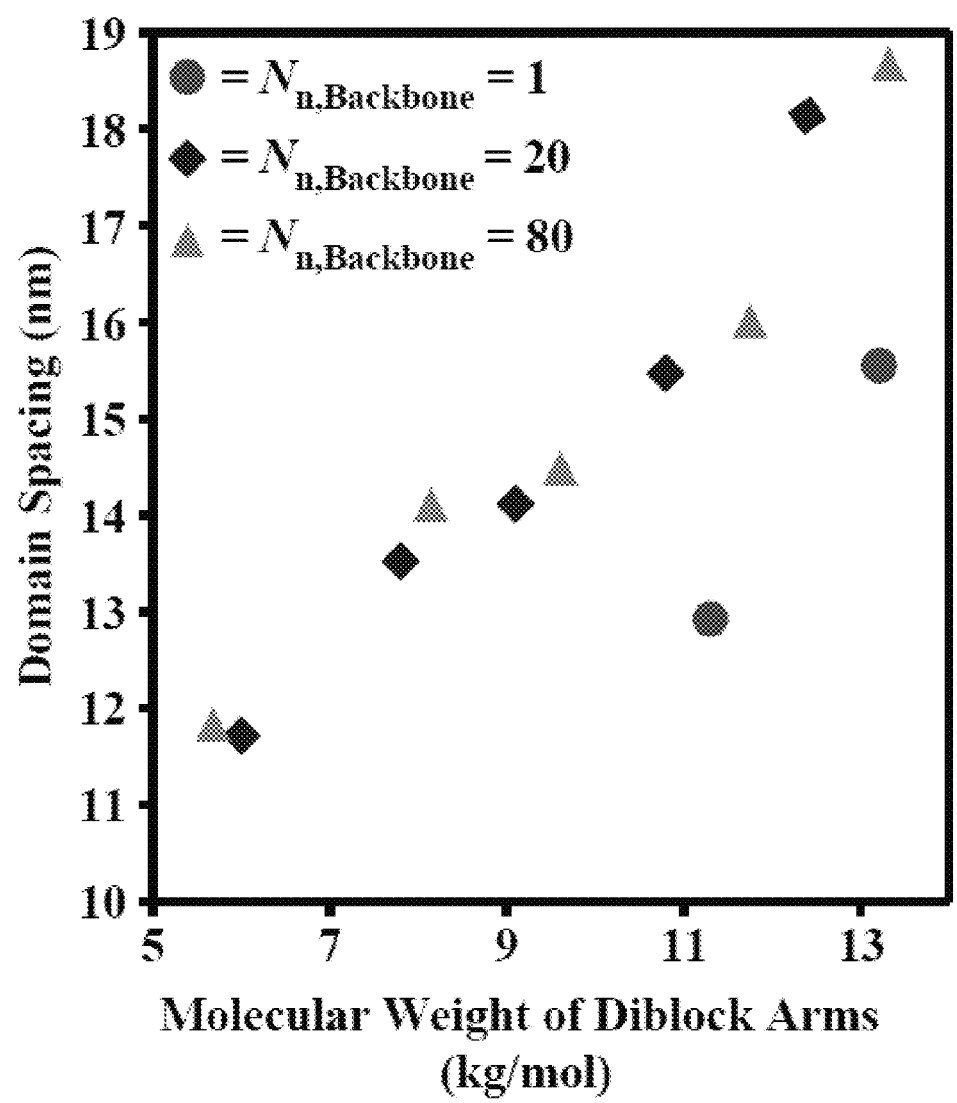
FIG. 4 is a plot showing lamellar domain spacing for microphase-separated films of $N_{n,backbone}=1$, 10, and 80 block copolymers as a function of arm molecular weight of a diblock unit of the block copolymer.

As discussed further below with respect to FIG. 4, while the $(\chi_{AB}N)_{ODT}$ decreases as $N_{backbone}$ increases, much of the decrease can be achieved at relatively low degrees of backbone polymerization, e.g., $N_{backbone}$ of 10-20.

Figure 7:
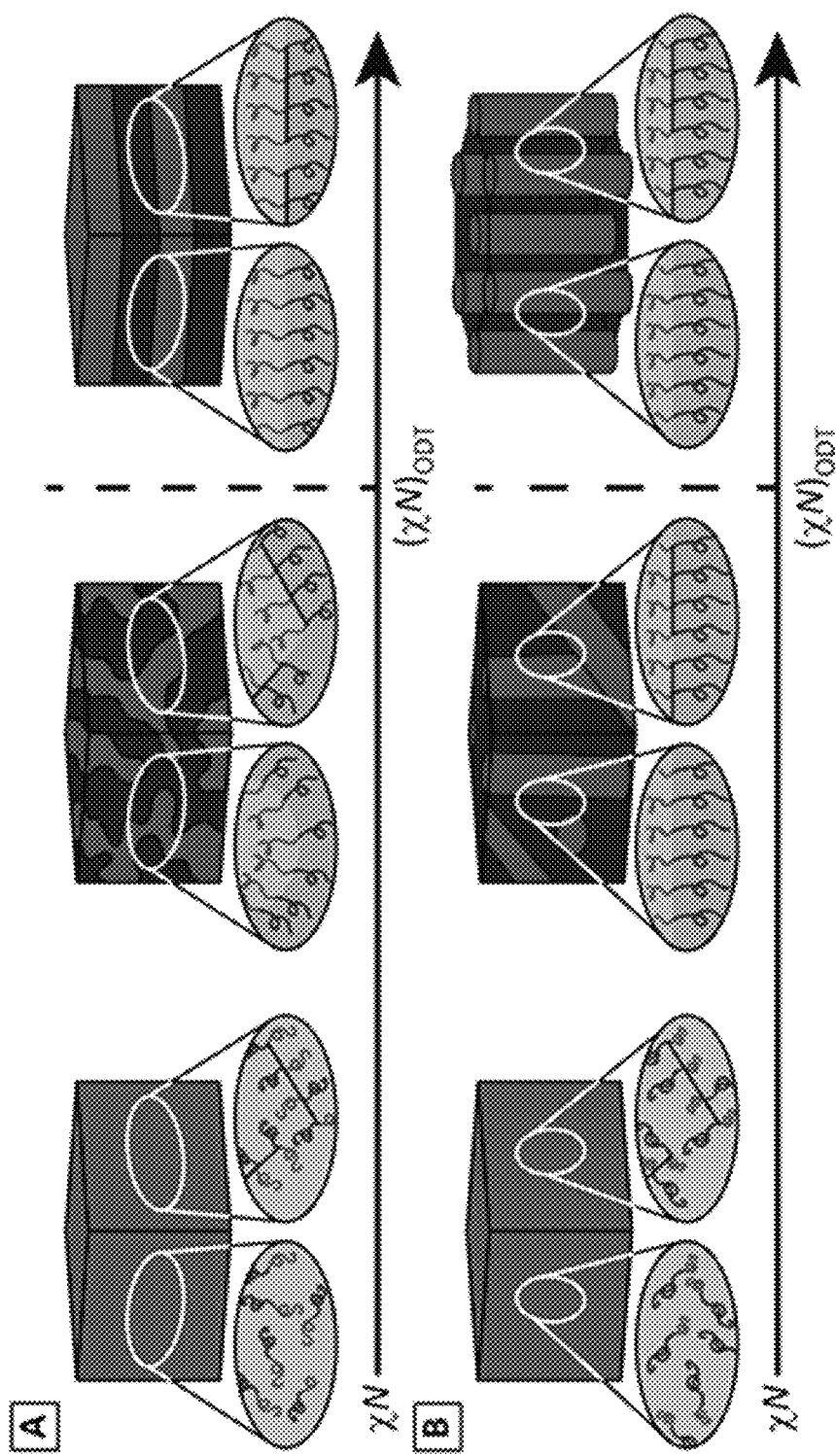
FIG. 7 is a schematic illustration of microphase separation of symmetric (panel A) and asymmetric (panel B) block copolymer bottlebrushes.

While the examples herein focus on microphase-separated materials that exhibit lamellar morphologies, in some implementations, the microphase-separated materials exhibit other morphologies such as cylindrical and spherical morphologies. Accordingly, the tethered-together block copolymers in the block copolymer bottlebrush may be symmetric or asymmetric. A symmetric diblock copolymer is one that is lamellae-forming, generally with $f_A=1-f_B$ between 0.35 and 0.65. Asymmetric diblock copolymers are either cylinder- or sphere-forming, generally with $f_A=1-f_B$ between 0.05 and 0.35 or 0.65 and 0.95. Implementations including cylinder-forming block copolymers are discussed further below with reference to FIG. 7. While in principle triblock or higher-order block copolymers could be used, the advantages of ease of processing are particularly realized with diblock systems.

In some implementations, the polymerization technique used to form the backbone may lead to broad dispersity backbone with an average number of repeat units $N_{n,backbone}$. This allows for the backbone of these block copolymer bottlebrushes to be made by any polymerization technique. In other implementations, the dispersity of the tethered-together block copolymers in the block copolymer bottlebrush may also be broad.

The block copolymer bottlebrush material may consist essentially of the block copolymer bottlebrush or the block copolymer bottlebrush may be blended with another material, such as one or more homopolymers, non-volatile solvents, small molecule therapeutics, conductivity enhancing agents, or plasticizers. In some implementations, the material may include nanoparticles that selectively partition in one of the phases or at the interface of the phases.

As discussed above, the microphase-separated block copolymer bottlebrush materials have lower $(\chi_{AB}N)_{ODT}$ and reduced domain spacing over other block copolymer systems. These phenomena are discussed further with reference to a study of a library of PS-b-PLA block copolymer bottlebrushes. PS-b-PLA diblock copolymers are technologically relevant materials that have a relatively high $\chi_{AB}$, thus allowing for microphase separation at relevant length scales for next generation lithography applications, and can be easily processed as thin films. Likewise, the mechanistic orthogonality between polymerization conditions of poly(styrene) and poly(lactide) lends itself well to the synthesis of a variety of block copolymer bottlebrushes. This allows the characterization of the microphase separation behavior of AB diblock copolymers linked at the interface through block copolymer bottlebrushes as a function of both arm molecular weight and the degree of polymerization of the backbone.

Figure 2A:
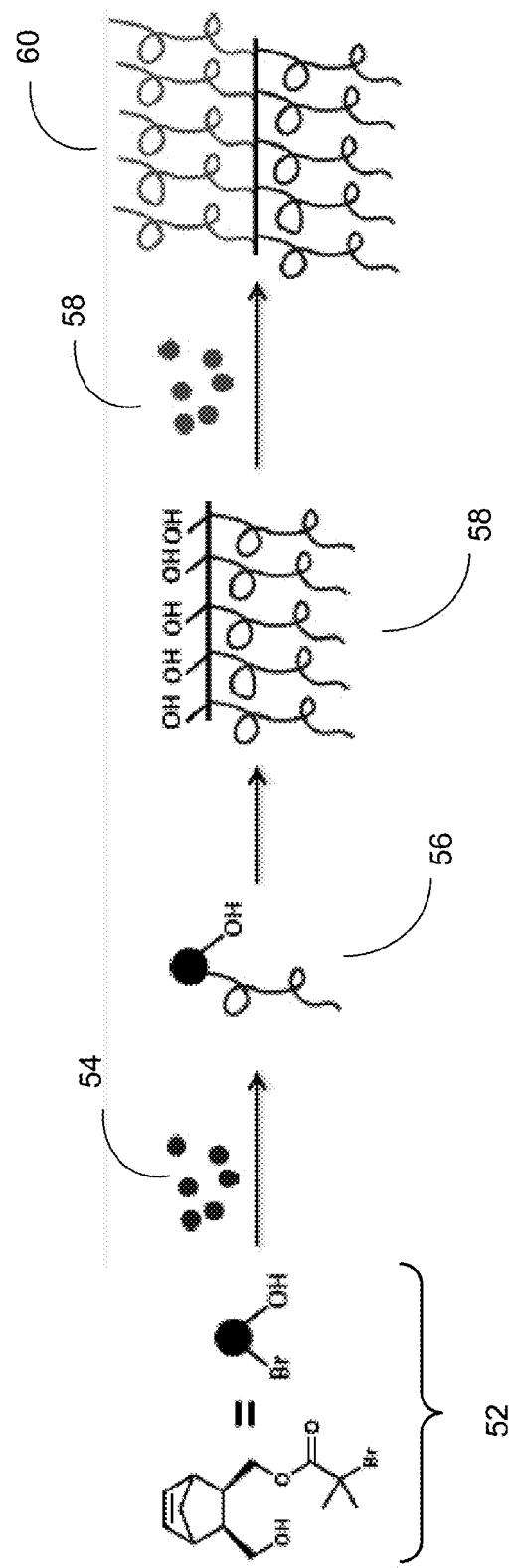
FIGS. 2A-2C are schematic illustrations of examples of representative syntheses of block copolymer bottlebrushes.

A library of block copolymer bottlebrushes with backbone degrees of polymerizations of 10, 20, 40, and 80 and total arm molecular weights relative to the comparable diblock copolymer ranging from 2.9-12.4 kg/mol with relatively symmetric volume fractions ($f_{PLA} \sim f_{PS} \sim 0.5$) for each arm was synthesized. Twenty-eight unique block copolymer bottlebrushes samples with 7 diblock copolymer controls were produced. FIG. 2A shows a high-level depiction of the modular synthesis employed to generate the library. It should be noted that although the synthesis described herein is useful for generation of a library to characterize the microphase separation of the block copolymer bottlebrushes, anionic polymerization techniques or any other appropriate synthetic route may be employed to generate block copolymer bottlebrushes that may be employed in the materials disclosed herein. See, e.g., Zhang, *Macromolecules*, 2008, 41, 9004; Cheng, *ACS Macro Lett.*, 2012, 1, 52; Fontaine, *Eur. Polym. J.* 2013, 49, 972; Liu, *Macromolecules*, 2009, 42, 2916; and *Polymer J.*, 2002, 34, 633, which are incorporated by reference herein.

In FIG. 2A, poly(styrene) macromonomers 56 are synthesized from styrene monomers 54 using a norbornene 52. A poly(styrene) bottlebrush polymer 58 is then synthesized, for example, by ring opening metathesis polymerization (ROMP) of the norbornene 52, followed by ring opening polymerization (ROP) of lactide 60 to synthesize the poly(styrene-block-lactide) block copolymer bottlebrush 62. Details of a representative synthesis according to FIG. 2A are given below in Example 1. A series of block copolymer bottlebrushes that were made via this synthetic route are listed in Table 2 in Example 1. Each block copolymer bottlebrush sample is labeled as SL(X,Y,Z) for Styrene-Lactide with total arm molecular weights relative to the comparable diblock copolymer (X, kg/mol), $f_{PLA}$ (Y) and $N_{n,backbone}$ (Z). Additionally, a diblock copolymer control from each poly(styrene) macromonomer was also synthesized by excluding the ROMP of the norbornene and directly using the poly(styrene) macromonomer for the ROP of lactide. These diblock copolymer are referred to as a block copolymer bottlebrush with $N_{n,backbone}=1$.

Figure 2B:
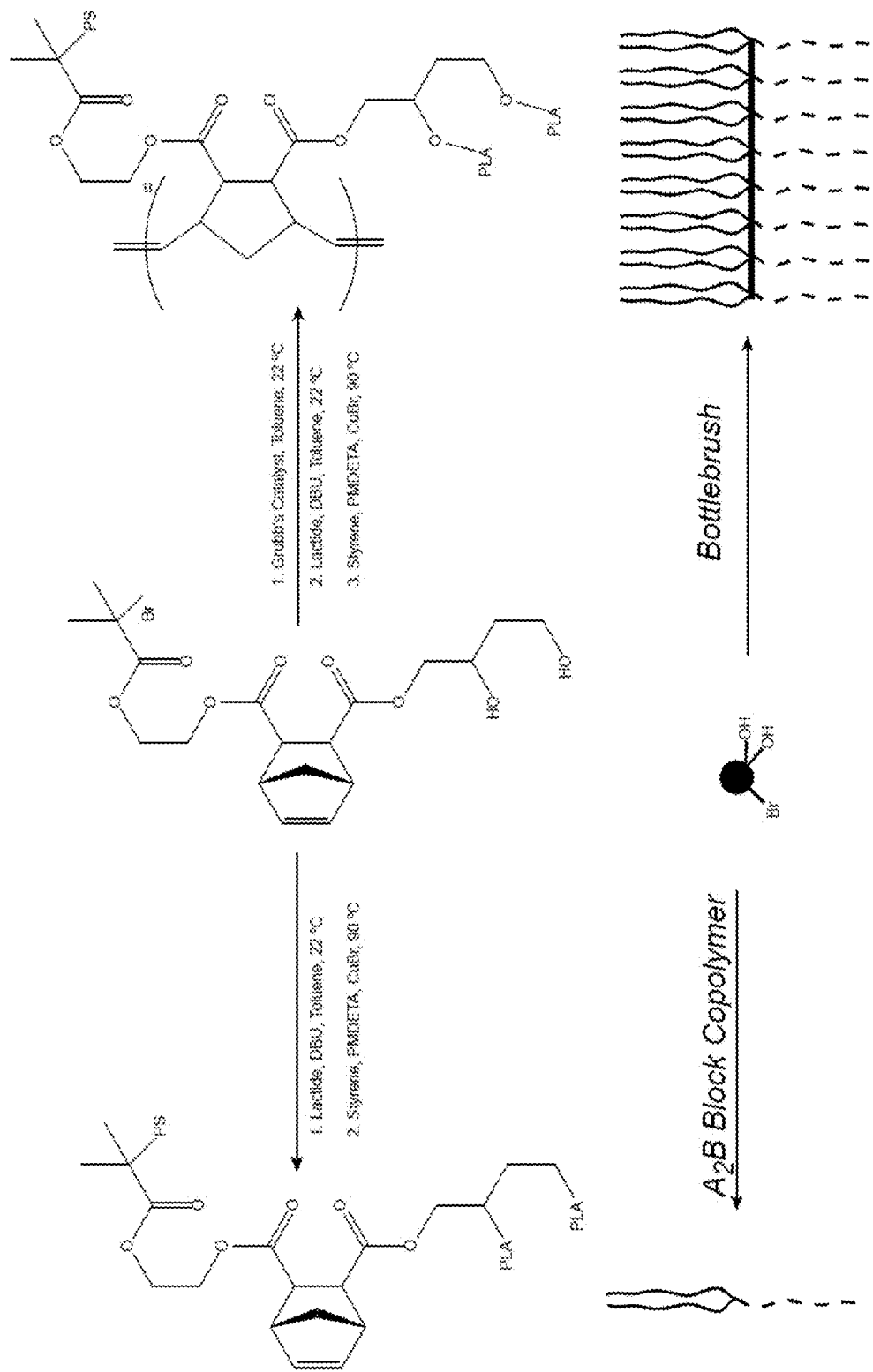
Figure 2C:
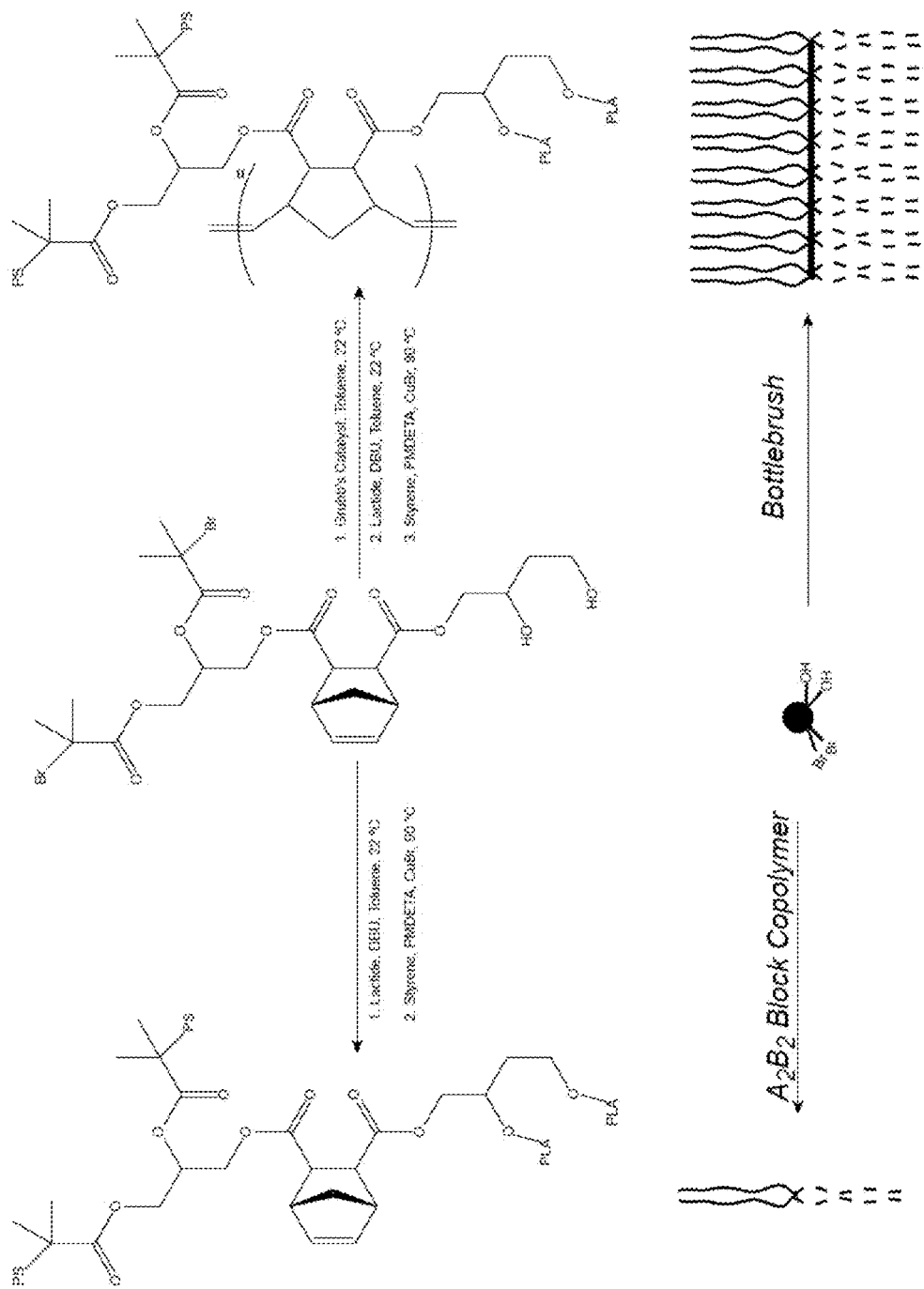

Examples of syntheses to form $A_2B$ and $A_2B_2$ star block copolymer bottlebrushes that are chemically related to the PS-b-PLA bottlebrushes described above are given in FIGS. 2B and 2C.

The order-disorder transition and morphological behavior of symmetric poly(styrene-block-lactide) block copolymer bottlebrushes were investigated via synchrotron small angle X-ray scattering (SAXS). SAXS analysis of the poly(styrene-block-lactide) bottlebrush) diblock copolymers controls were used a baseline for comparisons. A reference temperature of 115° C. was used for all SAXS measurements due to it being above the glass transition temperatures for both blocks in the highest molecular weight diblock copolymer.

All block copolymer bottlebrushes exhibited microphase separated lamellar morphologies at much lower critical weights than can be achieved with the diblock copolymer. FIGS. 3A and 3B show small angle X-ray scattering (SAXS) patterns for a series of PS-b-PLA block copolymer bottlebrushes with $N_{n,backbone}=20$ (FIG. 3A) and a series of PS-b-PLA diblock copolymers ($N_{n,backbone}=1$) (FIG. 3B) with markers indicating the calculated peak positions for a lamellar morphology. Turning first to FIG. 3B, the 10.6 kg/mol and 12.3 kg/mol diblock copolymer samples were microphase-separated as indicated by the sharp peaks in the patterns for these samples (SL(10.6,0.50,1) and SL(12.3, 0.50,1)). However, going to a lower molecular weight diblock copolymer sample, SL(8.6,0.50,1), the principal scattering peak is broadened significantly and no higher order reflections were observed, thus indicating that SL(8.6, 0.50,1) did not form an ordered, microphase separated morphology.

FIG. 3A shows the SAXS data for the series of block copolymer bottlebrushes with $N_{n,backbone}=20$. The SAXS patterns reveal that the highest arm molecular weight block copolymer bottlebrushes with $N_{n,backbone}=20$, SL(12.4,0.51, 20) and SL(10.8,0.51,20), microphase separated into well-ordered symmetric lamellar morphologies, but experienced some amount of domain dilation ($d_{SL(12.4,0.51,20)}=18.1$ nm, $d_{SL(10.8,0.51,20)}=15.5$ nm) compared to their diblock counterparts ($d_{SL(12.3,0.51,1)}=15.6$ nm, $d_{SL(10.6,0.50,1)}=12.9$ nm). Unlike the diblock copolymer samples though, lower molecular weights of the arms (SL(9.1,0.53,20)-SL(6.0, 0.54,20)) retained a sharp principal scattering peak along with higher order reflections, thus confirming that these samples still are microphase separated into lamellar morphologies at much lower critical molecular weights than can be achieved with a poly(styrene-block-lactide) diblock copolymer.

Smaller domain sizes were achieved with the block copolymer bottlebrushes compared to the diblock copolymers. This can be seen in FIG. 4, which shows lamellar domain spacing for microphase-separated films for $N_{n,backbone}=1$, 10, and 20 block copolymers as a function of arm molecular weight of a diblock unit of the block copolymer. Two interesting phenomena are observed; first, even though the microphase separated arms of the block copolymer bottlebrushes with $N_{n,backbone}=20$ (diamond) have a larger domain spacing than the comparative diblock copolymer (circle) ($d_{SL(10.8,0.51,20)}=15.5$ nm vs. $d_{SL(10.6,0.50,1)}=12.9$ nm), the critical lowering of the degree of polymerization necessary for microphase separation leads to smaller periodicities ($d_{SL(6.0,0.54,20)}=11.7$ nm) than are accessible via poly(styrene-block-lactide) diblock copolymers. Second, the domain spacing for block copolymer bottlebrushes is relatively independent of the backbone degree of polymerization for $N_{n,backbone}$=10-80. This can be seen comparing the series with $N_{n,backbone}$=20 (diamond) and $N_{n,backbone}$=80 (triangle) in FIG. 4.

Figure 5:
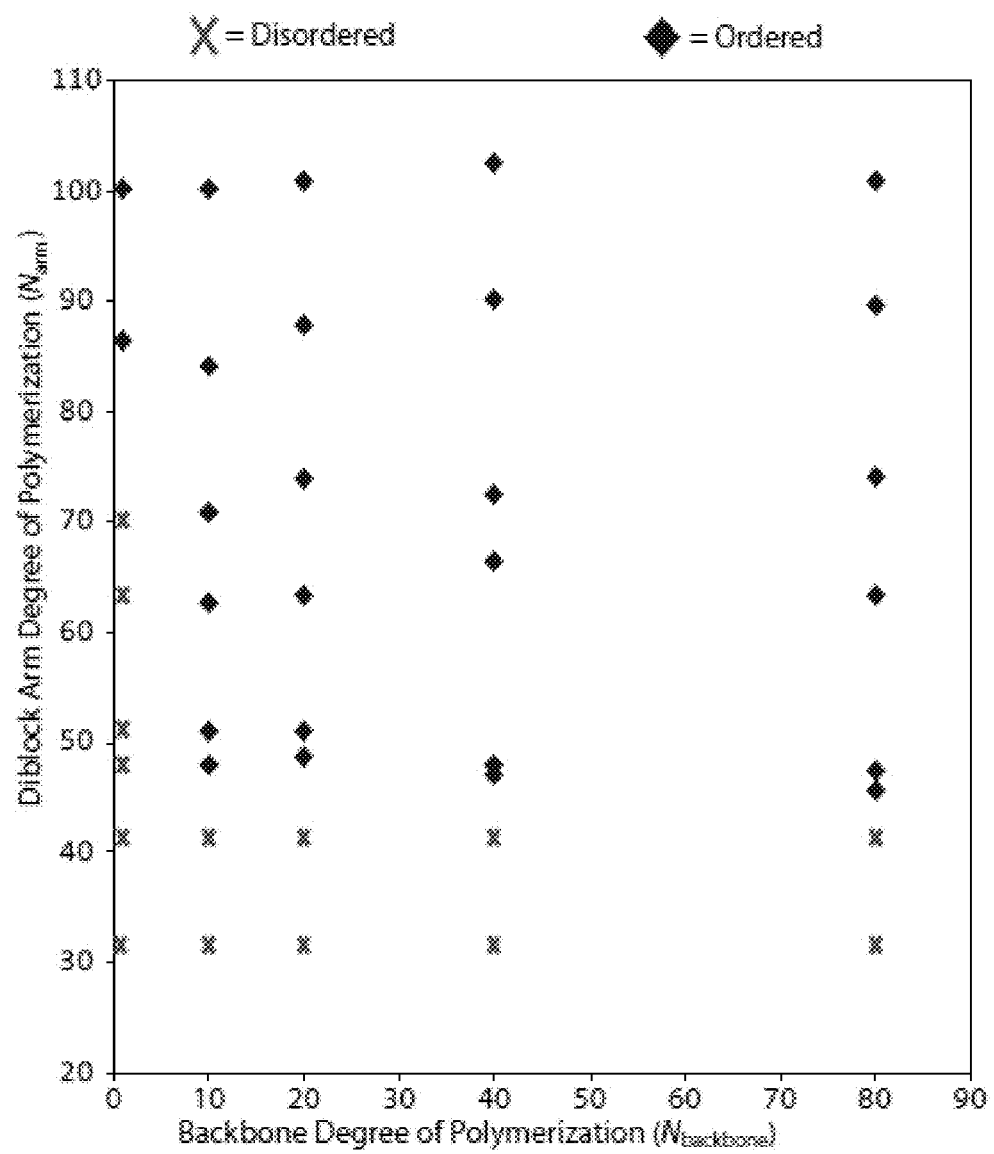
FIG. 5 is a plot showing degree of polymerization ($N_{arm}$) order-disorder transitions for $N_{n,backbone}=1$, 10, 20, 40, and 80 block copolymers at 115° C.

FIG. 5 shows the critical arm degree of polymerization ($N_{arm}$) at the order-disorder transitions for $N_{n,backbone}$=1, 10, 20, 40, and 80 block copolymers at 115° C. For $N_{n,backbone}$=10-80, the minimum degree of arm polymerization for microphase separation is fairly constant, between 40 and 50, decreasing only slightly as $N_{n,backbone}$ increases. This is in comparison to the untethered diblock copolymer ($N_{n,backbone}$=1), which requires a much higher degree of polymerization, close to 90, nearly double that of the block copolymer bottlebrushes.

Temperature-dependent SAXS studies were performed on all samples with the lowest critical degree of arm polymerization necessary for microphase separation at 115° C. for each backbone length ($N_{n,backbone}$=1, 10, 20, 40, 80). An order-disorder temperature for the diblock copolymer arms ($T_{ODT,arm}$) was determined for each backbone length. For example for SL(6.0,0.54,20), temperature-dependent studies showed that from 115-145° C. the SAXS patterns retained a sharp principal scattering peak along with higher order reflections. At 150° C., the principal scattering peak began to broaden and higher order reflections weakened. By 160° C., the principal peak was significantly broadened and no higher order peaks were observed, thus the $T_{ODT,arm}$ for SL(6.0,0.54,20) is 150° C. Table 1 shows the $T_{ODT,arm}$ for each backbone length. No polymer with $N_{n,backbone}$=80 had an accessible $T_{ODT,arm}$, thus the $T_{ODT,arm}$ for SL(5.6,0.51, 80) was assigned to 185° C., the highest temperature measured prior to sample degradation.

TABLE 1

$T_{ODT,arm}$ for $N_{n, backbone}$ of 1, 10, 20, 40 and 80

| $N_{n, backbone}$ | Sample | $T_{ODT}$ |
|---|---|---|
| 1 | SL(10.6, 0.51, 1) | 125° C. |
| 10 | SL(5.9, 0.53, 10) | 115° C. |
| 20 | SL(6.0, 0.54, 20) | 150° C. |
| 40 | SL(5.8, 0.53, 40) | 155° C. |
| 80 | SL(5.6, 0.51, 80) | 185° C. (assigned) |

As can be seen from Table 1, the $T_{ODT}$ for the arms is highly dependent on the backbone degree of polymerization.

From the $T_{ODT}$'s in Table 1, $\chi$ values were determined using the following temperature-dependent $\chi$ relationship experimentally derived by Zalusky et al., for poly(styrene-block-lactide) diblock copolymers. See J. Amer. Chem. Soc. 2002 124, 12761-12773, incorporated by reference herein.

$$\chi(T)=98.1/T-0.112 \tag{1}$$

Using the $T_{ODT}$ for each sample, the temperature-dependent $\chi$ along with the segment density-normalized degree of polymerization were used to calculate the critical $\chi N$ necessary for microphase separation of the arms in block copolymer bottlebrushes with the lowest critical arm degrees of polymerization necessary for microphase separation at $N_{n,backbone}$=1, 10, 20, 40, and 80. For the diblock copolymer the critical $\chi N$ necessary for microphase separation was calculated to be 11.6, which is higher than the mean-filed theory minimum value of $(\chi_{AB}N) \geq 10.5$. This behavior can be attributed to fluctuation effects in low molecular weight diblock copolymers, which increases the critical $\chi N$ necessary for microphase separation. Shifting from the diblock copolymer to a block copolymer bottlebrush with a $N_{n,backbone}$=10, the critical $\chi N_{arm}$ for microphase separation drops to 6.8, a value close to half that of the diblock copolymer. Increasing the backbone degree of polymerization above 10 reveals that the $\chi N_{arm}$ necessary for microphase separation continues to decrease as the backbone degree of polymerization increases, but that the strongest correlation between the decrease of $(\chi N_{arm})_{ODT}$ as $N_{n,backbone}$ increases occurs at low backbone degrees of polymerization ($N_{n,backbone} \leq 10$). With this microphase separation, a block copolymer bottlebrush with $N_{n,backbone}$=80 with an $(\chi N_{arm})_{ODT}$=4.7 was produced.

Figure 6:
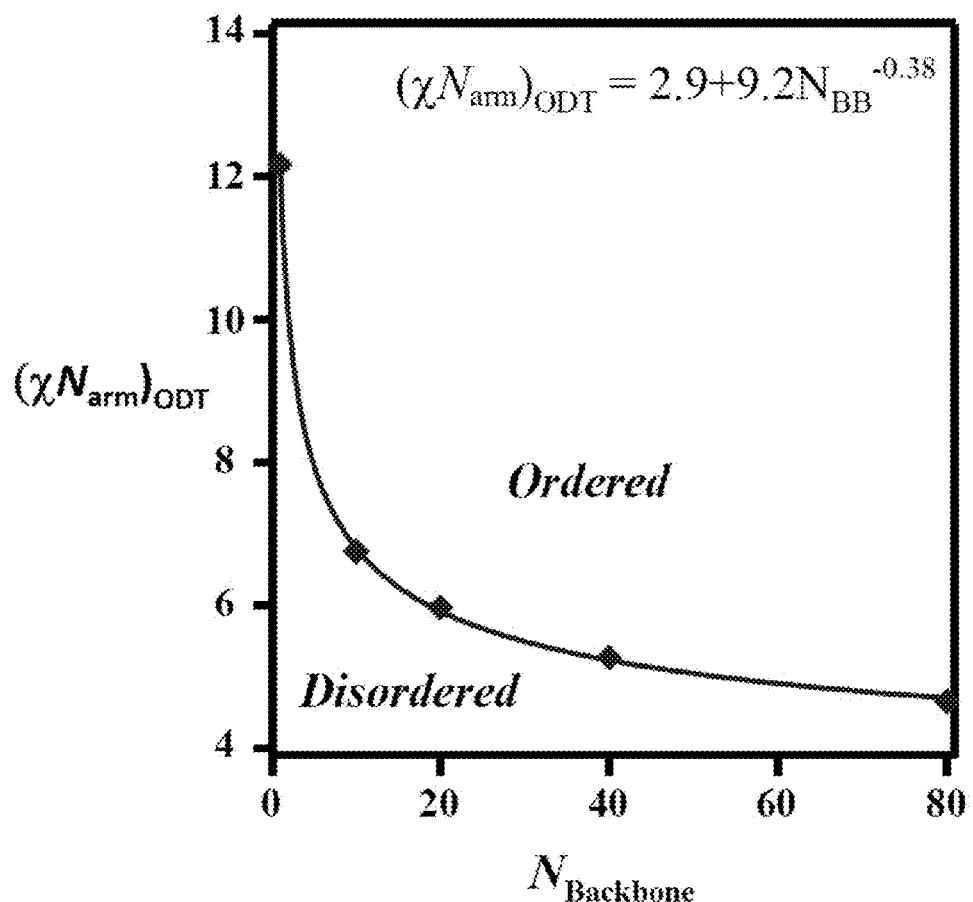
FIG. 6 shows a curve fit showing the dependence of the minimum segregation strength $(\chi N_{arm})_{ODT}$ on degree of backbone polymerization $N_{backbone}$.

FIG. 6 is a plot showing the effect of backbone degree of polymerization on $(\chi N_{arm})_{ODT}$. By increasing the backbone degree of polymerization the critical $\chi N_{arm}$ necessary for microphase separation decreases. Fitting the data shows results in the following expression:

$$(\chi N_{arm})_{ODT}=3+8.6N_{backbone}^{-0.36} \tag{2}$$

Accordingly, $(\chi N)_{ODT} \alpha N_{backbone}^{-0.4}$ and reaches a critical lowering to about 3 at infinite $N_{Backbone}$. Although derived from data from poly(styrene-block-lactide) block copolymer bottlebrush systems, the relationship between backbone degree of polymerization on $(\chi N_{arm})_{ODT}$ shown in FIG. 6 can be applied to other bottlebrush copolymer systems. It should be noted that the curve in FIG. 6 flattens out around $N_{Backbone}$=10-20, indicating that the benefits of the block copolymer bottlebrush materials may be realized at relatively low degrees of backbone polymerization.

The critical $\chi N$ for phase separation for the block copolymer bottlebrushes (~3.0) is significantly lower than the 10.5 for diblock copolymers. It is also significantly lower than the critical $\chi N$ of about 7.5 for phase separation of $(AB)_n$ multiblock copolymers and approached the critical $\chi N$ of about 2 for blends of A and B homopolymers. Wu et al., *Macromolecules*, 2004, 37, 3360-3368, incorporated by reference herein. As such, the $(\chi N)_{ODT}$ is the lowest known critical segregation strength for block copolymer materials.

The percent reduction in lamellar domain spacing achievable as $N_{n,backbone}$ goes to infinity was determined as follows. The theoretical scaling of a periodicity in a block copolymer is:

$$d_{Lam}=1.096a_{AB}\chi^{1/6}N^{2/3} \tag{3}$$

wherein $a_{AB}$ is the volume fraction-weighted statistical segment length that is normalized to the same reference volume as $\chi_{AB}$ and N. For an AB diblock copolymer, $(\chi_{AB}N)_{ODT}$ is about 10.5. From this, the relationship between the lamellar domain spacing of an AB diblock copolymer can be determined as follows:

$$(N_{diblock})_{ODT}=10.5/\chi \tag{4}$$

$$(d_{diblock})_{Lam}=1.096a_{AB}\chi^{1/6}(10.5/\chi)^{2/3} \tag{5}$$

$$(d_{diblock})_{Lam} \sim 4.795 \times 1.096a_{AB}\chi^{-1/2} \tag{6}$$

From (2) and (3), the scaling of the periodicity in a microphase-separated block copolymer bottlebrush film can be determined:

$$(d_{arm})_{Lam}=1.096a_{AB}\chi^{1/6}(3+8.6N_{Backbone}^{-0.36}/\chi)^{2/3} \tag{7}$$

and as $N_{Backbone} \rightarrow \infty$, $$(d_{arm})_{Lam}=1.096a_{AB}\chi^{-1/2}(3)^{2/3} \tag{8}$$

$$(d_{arm})_{Lam} \sim 2.080 \times 1.096a_{AB}\chi^{-1/2} \tag{9}$$

Comparing (6) and (9), the percent reduction in minimum domain spacing for a microphase-separated AB block copolymer bottlebrush over a microphase-separated AB diblock copolymer can be determined:

$$\text{Percent Reduction} = \frac{(d_{diblock})_{Lam} - (d_{arms})_{Lam}}{(d_{diblock})_{Lam}} \times 100 = \frac{4.79 - 2.08}{4.79} \times 100 \sim 56\% \qquad (10)$$

Accordingly, the AB block copolymer bottlebrush microphase separated materials disclosed herein can be used to achieve a reduction in domain spacing of over 50% compared to the minimum domain spacing of any conventional AB diblock copolymer system.

The block copolymer bottlebrush microphase-separated materials may also be used to achieve a reduction in spacing compared to the minimum domain spacing of a AB multi-block copolymer system, for which the smallest lamellar domain spacing is $3.832 \times 1.096 a_{AB} \chi^{-1/2}$.

Implementations of the methods and compositions described herein may use asymmetric block copolymer bottlebrushes. As described above, asymmetric diblock copolymers may exhibit sphere- or cylinder-forming morphologies. The controlled orientation of cylinder-forming morphologies can be used to template both dots and lines on a substrate. Examples of applications that use "dot" templates include bit patterned media.

Synthesis of asymmetric PS-b-PLA samples labelled as SL(X,Y,Z) for Styrene-Lactide with total arm molecular weights relative to the comparable diblock copolymer (X kg/mol), $f_{PLA}$ (Y), and $N_{backbone}$ (Z) is discussed in Examples 4-6 below, along with an analysis of their morphologies, order-disorder transition, and domain spacing.

As with lamellar-forming morphologies, covalently tethering the interface of cylinder-forming asymmetric block copolymers lowers the critical $\chi_{AB}N_n$ necessary for microphase separation, but to a lower extent than for symmetric diblock copolymers. The experimental results discussed in the Examples show that covalently tethering the interfaces of the hexagonally-packed cylinders stabilizes microphase separation and lowers the $(\chi N)_{ODT}$ by about 25%, as compared to about a decrease of 50% in $(\chi N)_{ODT}$ in the lamellar morphology observed by covalently linking the interfaces of symmetric block copolymers. This phenomena is explained with reference to FIG. 7, which is a schematic illustration of microphase separation of symmetric (panel A) and asymmetric (panel B) block copolymer bottlebrushes. At low $\chi N$, symmetric and asymmetric block copolymers form disordered, melt miscible systems (panel A and panel B, left). As $\chi N$ increases, symmetric block copolymer bottlebrushes (panel A) microphase separate into a disordered fluctuating phase (middle) before ordering into a lamellar morphology (right). By covalently tethering the interfaces of the block copolymers together, the fluctuation effects are greatly decreased, and thus microphase separation at much lower $\chi N$ is accessible. For asymmetric block copolymers (panel B), increasing $\chi N$ leads to micellization of the block copolymers into cylinders that do not order on a lattice (middle) followed by ordering the cylinder onto a hexagonal lattice (right). Since fluctuation effects are not as prevalent in the asymmetric block copolymer system, dampening them via covalently tethering the interface only moderately lowers the critical $\chi N$ necessary for microphase separation.

The cylinder-forming asymmetric block copolymer bottlebrushes follow two trends observed in block copolymer bottlebrushes forming a lamellar morphology. First, the stabilization of the hexagonally-packed cylinders morphology in asymmetric block copolymer bottlebrushes allows these macromolecules to access smaller periodicities than their linear diblock copolymer analogs. Second, the observed periodicities are highly dependent on $M_{n,arm}$ yet are relatively independent of $N_{backbone}$. Although this trend may be expected for lamellar forming systems because the bottlebrush backbone can sit along the flat interface between PLA and PS microdomains, it is less intuitive for macromolecules forming a hexagonally-packed cylinder morphology.

As described above, the thermodynamics of block copolymer microphase separation is controlled by enthalpically unfavorable A/B monomer contacts and the entropy of the system. In diblock copolymers that are strongly segregated ($\chi N > (\chi N)$ oar), thermodynamically stable morphologies are primarily a function of $f_A$, which is controlled through the volume normalized degree of polymerization between each homopolymer segment. When symmetric diblock copolymers ($f_A=0.50$) microphase separate, a lamellar morphology is thermodynamically stable because it minimizes unfavorable chain stretching and A/B monomer contacts in the diblock copolymer. As diblock copolymers deviate from a symmetric composition ($f_A \neq 0, 50$), the lamellar morphology causes asymmetric chain stretching and thus, an increased entropic penalty. Above a critical asymmetry, this entropic penalty overwhelms the enthalpic gains of minimizing A/B monomer contact and the morphology shifts from lamellae to hexagonally-packed cylinders to alleviate chain stretching. In random copolymer bottlebrushes, the volume fraction of the polymer is not controlled through the degrees of polymerization of each homopolymer segment, but instead by the number of each A/B homopolymer arms grafted along the backbone. For the formation of lamellar morphologies in symmetric random copolymer bottlebrushes, these arms partition evenly along the backbone to their respective domains and form a lamellar morphology. However, as the composition deviates from symmetry, microphase separation forces asymmetric partitioning of arms to their respective domain. This causes inequivalent congestion along the backbone and additional chain stretching. At volume fractions that would produce hexagonally-packed cylinders morphology in diblock copolymers, the entropic penalty of this asymmetric chain partitioning is quite large and inhibits microphase separation.

In contrast, for block copolymer bottlebrushes, the number of each arm type along the backbone is held constant while the volume fraction is controlled in an equivalent manner to diblock copolymers. This means that block copolymer bottlebrushes will always microphase separate with their arms being symmetrically distributed in each domain along the backbone, with the above-mentioned entropic penalty not occurring at the compositions needed to form hexagonally-packed cylinders morphology. Although bottlebrush block copolymers are able to form this morphology, this does not necessarily preclude the architecture from altering the microphase separation behavior as compared to that of the diblock copolymer. Considering that the steric hindrance around the backbone of bottlebrush copolymers does greatly increases the persistence length of these molecules normal to the domain interface, the backbone degree of polymerization could alter microphase separation. More specifically, if the backbone is located in a non-parallel orientation to the c-axis of the cylinder, the rod-like nature of bottlebrush copolymers could lead to domain dilation or morphological transitions as the backbone length increases. On the other hand, if the backbone is located parallel to the c-axis of the cylinder increasing the backbone length might have negligible effects on the morphological behavior above the critical $\chi N$ for microphase separation. The observed samples have similar cylinder-to-cylinder distance (dc-c, SL(17.0,0.31,20)=21.7 nm vs. dc-c, SL(18.3,0.23,80)=22.1 nm) at very different backbone lengths relative to the circumference of the cylinder; this lack of dependence between the backbone length and the microphase separation behavior in block copolymer bottlebrushes alludes to the backbone's confirmation being parallel to the c-axis of the cylinder.

Transitioning away from block copolymers that are strongly segregated ($\chi N > (\chi N)_{ODT}$) to samples that are weakly segregated ($\chi N \sim (\chi N)_{ODT}$), the thermodynamics of microphase separation become highly dependent on both $f_A$ and $\chi N$.

As with lamellar morphologies, using block copolymer bottlebrushes for hexagonally-packed cylinders allows reaching smaller length scales than observed in diblock copolymers. For example, a 30% reduction in cylinder-to-cylinder distance was observed for SL(10.7,0.27,20) vs SL(20.2,0.26,1) ($d_{c-c, SL(10.7,0.27,20)}$=13.0 nm vs. $d_{c-c, SL(20.2,0.26,1)}$=18.3 nm).

Figure 8A:
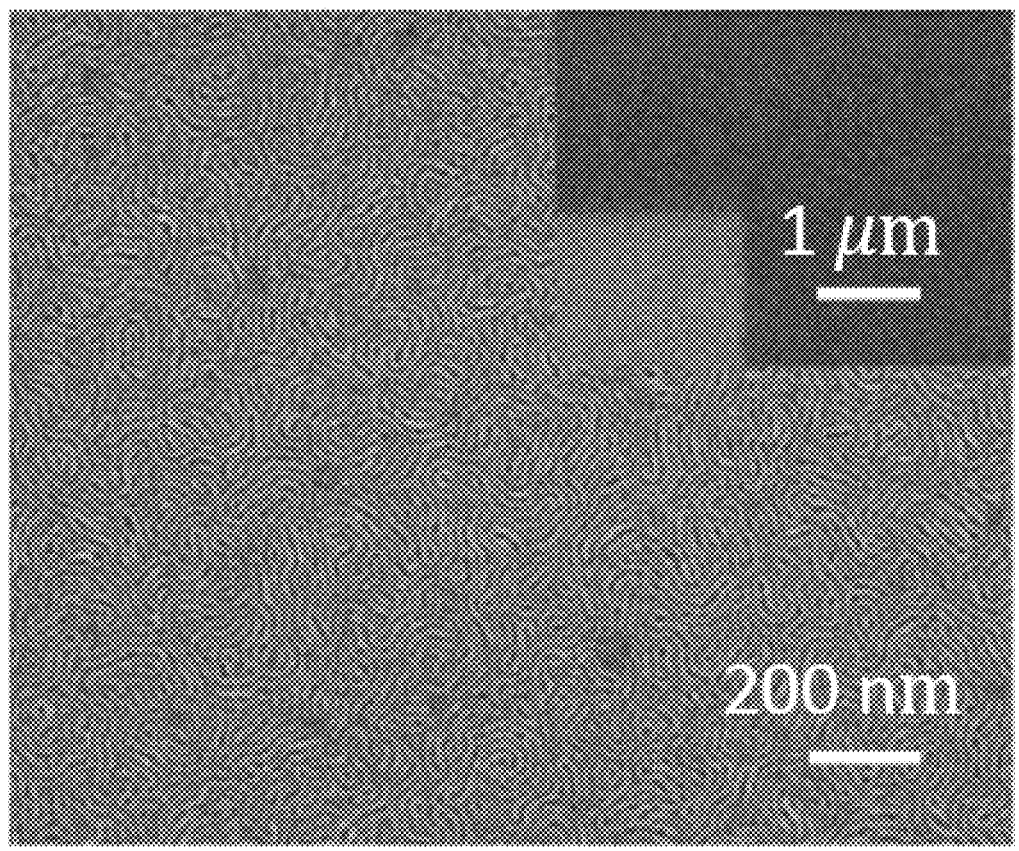
FIGS. 8A-8C show top-down scanning electron micrograph (SEM) images of 1) perpendicular-oriented domains in a thin film of a symmetric PS-b-PLA block copolymer bottlebrush (FIG. 8A); perpendicular-oriented domains in a thin film of an asymmetric PS-b-PLA block copolymer bottlebrush (FIG. 8B); and parallel-oriented domains in a thin film of an asymmetric PS-b-PLA block copolymer bottlebrush (FIG. 8C).
Figure 8C:
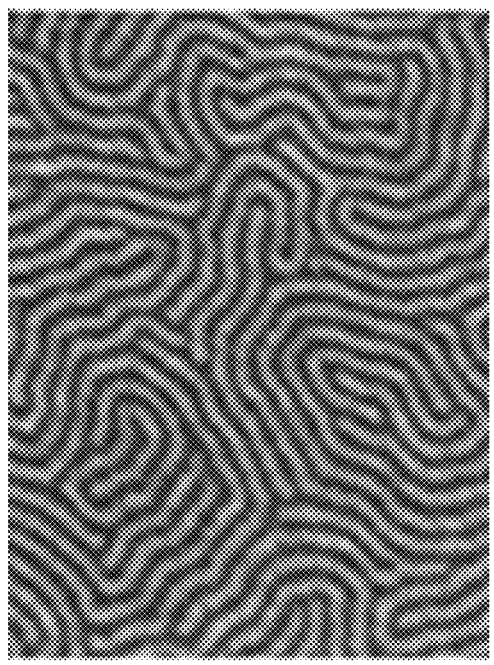
Figure 8B:
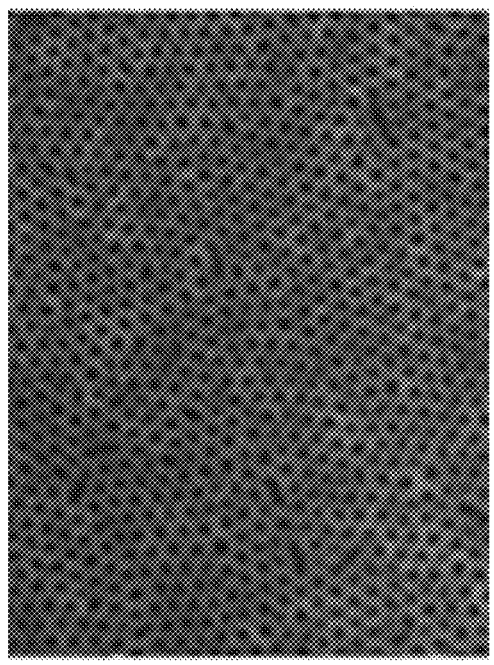

One advantage of using architectural effects to lower the critical feature sizes in block copolymers is that the processing conditions for the representative diblock copolymer are often already well known. FIG. 8A is a top-down SEM image of a microphase-separated thin film produced by processing techniques known to induce perpendicular orientation of the PS and PLA domains in PS-b-PLA diblock copolymer thin films, described further below in Example 3. The thin film exhibits a perpendicularly oriented lamellar morphology. FIGS. 8B and 8C are top-down SEM images microphase-separated thin films produced as described in Example 7 below. The thin film in FIG. 8B exhibits perpendicularly oriented cylindrical morphology and the thin film in FIG. 8C exhibits parallel cylindrical morphology.

Figure 9:
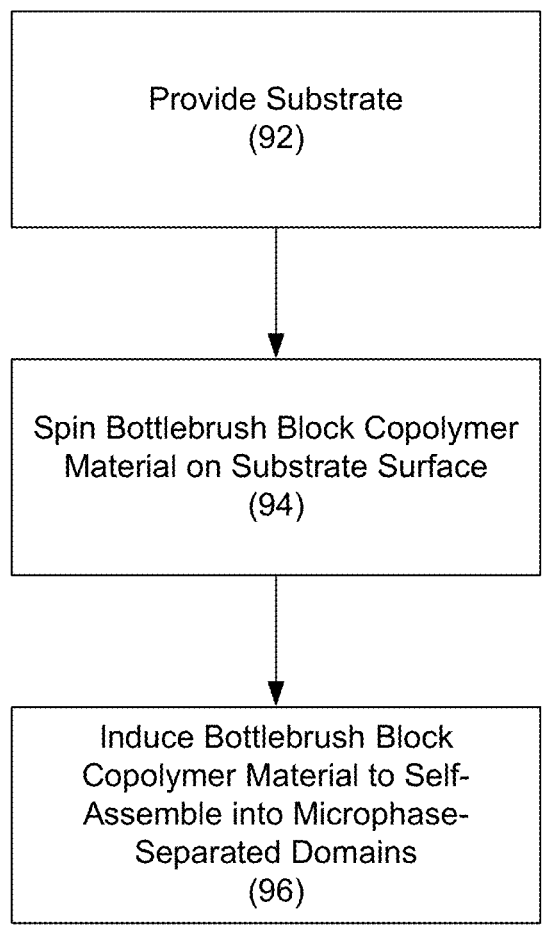
FIG. 9 is an example of a process flow diagram illustrating certain operations in forming a bottlebrush thin film composition.

Applications of the block copolymer bottlebrush materials include nanolithography for semiconductor devices, porous membranes, fabrication of cell-based assays, nanoprinting, nanotemplate synthesis, photovoltaic cells, patterned media, and surface-conduction electron-emitter displays. Many such applications involve thin films of the block copolymer bottlebrush material. FIG. 9 is an example of a process flow diagram illustrating certain operations in forming a bottlebrush thin film composition. The process begins by providing a substrate on which the thin film is to be formed. (92). Any type of substrate may be used. In semiconductor applications, wherein the block copolymer bottlebrush film may be used as a resist mask for further processing, substrates such as silicon or gallium arsenide may be used. For patterned media applications, a master pattern for patterned media may be made on almost any substrate material, e.g., silicon, quartz, or glass.

According to various implementations, the substrate surface may be non-preferential (neutral) to the blocks of the block copolymer bottlebrush or preferential to one of the blocks. In certain implementations, a non-preferential surface is employed such that the domains of the microphase-separated film will orient perpendicularly to the substrate. Also according to various implementations, the substrate may be patterned or unpatterned. Patterned substrates, including chemically patterned and topographically patterned substrates, may be used to guide the self-assembly of the domains of the microphase-separated film in particular patterns.

Next, a block copolymer bottlebrush material is spin-coated onto the substrate surface. (94). The thickness of the thin film to be formed may be determined by the amount of material formed on the surface in block 94, with example thicknesses ranging from the ones to tens of nanometers. Any appropriate thickness for the desired application may be employed.

The block copolymer bottlebrush material is then induced to self-assemble into microphase-separated domains. (96). Inducing a material to self-assemble typically involves thermally annealing the material above the glass transition temperature of the blocks of the block copolymer material or solvent evaporation, though any known technique may be used.

Depending on the substrate surface, the domains of the resulting block copolymer bottlebrush thin film may be oriented perpendicular or parallel to the substrate. Further, as indicated above, in some implementations, the domains may replicate an underlying pattern of a patterned substrate.

Figure 10:
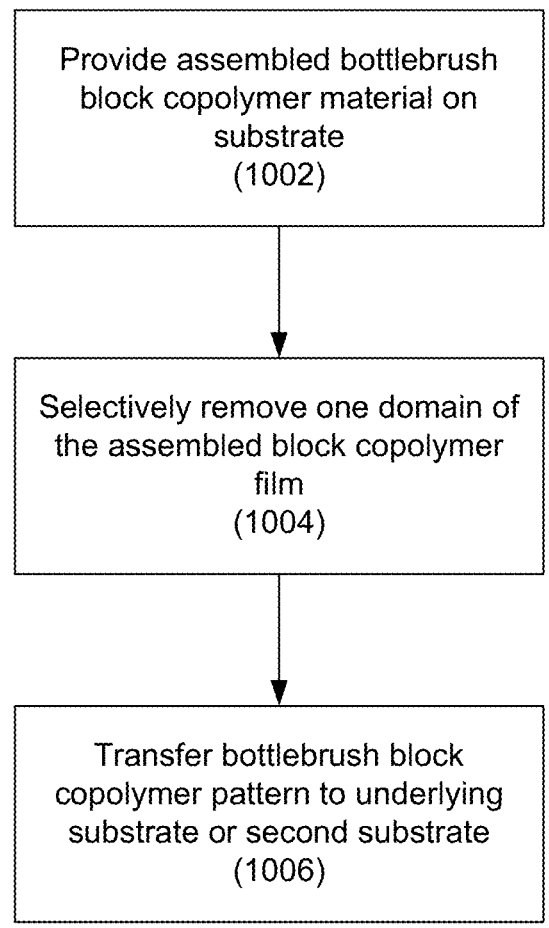
FIG. 10 is an example of a process flow diagram illustrating certain operations in a pattern transfer process using a bottlebrush thin film composition.

FIG. 10 is an example of a process flow diagram illustrating certain operations in a pattern transfer process using a bottlebrush thin film composition. First, a block copolymer bottlebrush film is directed to assemble on substrate. (1002). This is done in accordance with the methods described above with respect to FIG. 9. One of the domains of the block copolymer bottlebrush film is then removed, e.g., by an oxygen plasma, thereby creating raised of features of the other domain. (1004). The topographic pattern is then transferred to a substrate (1006). According to various embodiments, the pattern may be transferred by using the remaining polymer material as an etch mask for creating topography in the underlying substrate, or by replicating the topography in a second substrate using a molding or nanoimprinting process. Pattern transfer may have applications in the fabrication of integrated circuits, information storage, nanoimprint templates, for example.

Figure 11:
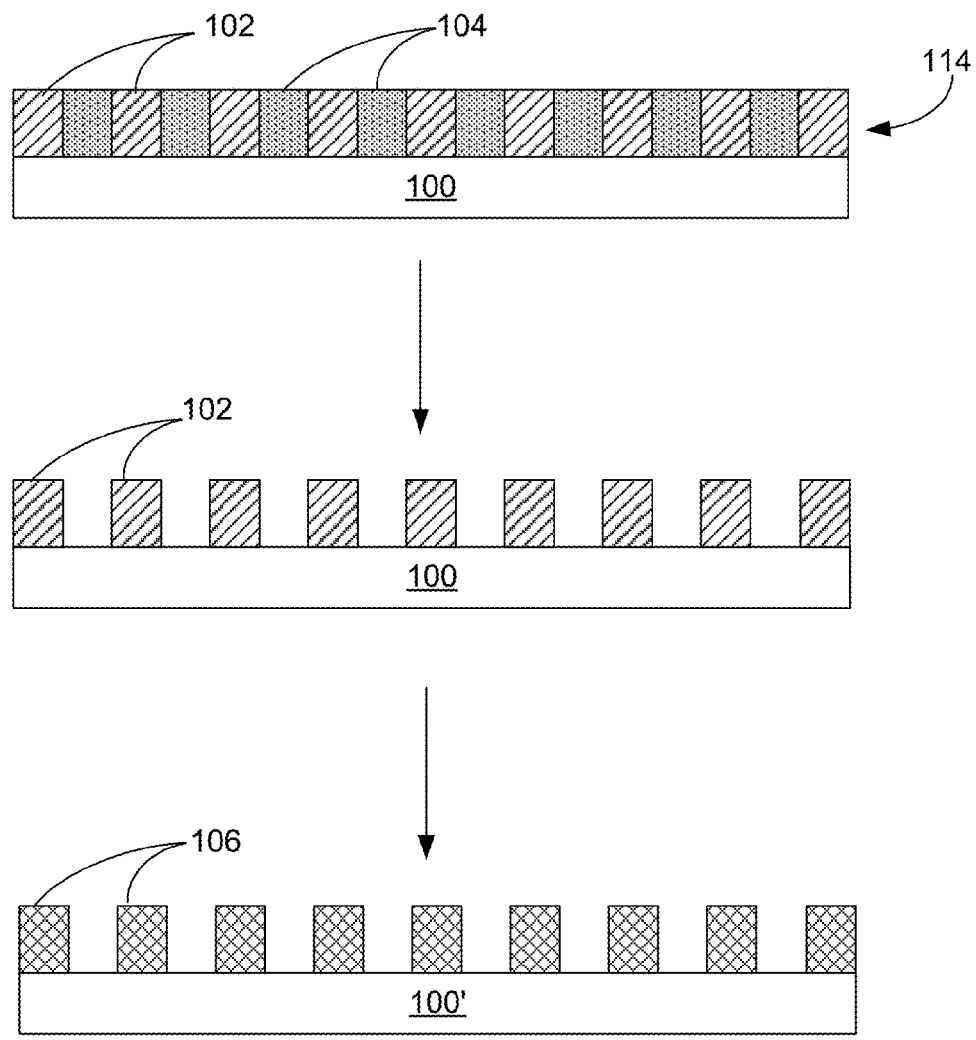
FIG. 11 shows schematic depictions of various stages of processing a bottlebrush thin film composition.

FIG. 11 shows schematic depictions of various stages of processing a bottlebrush thin film composition. A microphase-separated AB block copolymer bottlebrush thin film 114 is formed on a substrate 100 and includes A domains 102 and B domains 104. The B-domains are selectively removed, leaving the A domains 102. In some implementations, the A-domains 102 may then be further functionalized, resulting in features 106. In some implementations, the pattern formed after selective removal of the B-domains may be transferred to a substrate 100'. In such a case, features 106 may represent, for example, unetched portions of the substrate 100'.

Known processing conditions for the diblock copolymers of the block copolymer bottlebrushes may be used. Examples of such processing conditions may be found in Hillmyer et al. *Macromolecules,* 2005, 38, 10101 and Keen, et al., *Langmuir,* 2012, 28, 15876, incorporated by reference herein.

Example 1: Representative Synthesis of Poly(Styrene-Block-Lactide) Block Copolymer Bottlebrush Synthesis of 2-exo-hydroxymethyl-3-exo-(2-bromoisobutyryloxymethyl)-5-norbornene 2-exo-hydroxymethyl-3-exo-(2-bromoisobutyryloxymethyl)-5-norbornene (2) was made using a modified literature procedure. Under nitrogen, a solution of 2,3-exo,exo-dihydroxy-5-norbornene (1) (1.805 g, 11.8 mmol) and Et$_3$N (4.0 mL, 28.6 mmol) in 20 mL of dry CH$_2$Cl$_2$ was cooled to 0° C., before adding a solution of 2-bromoisobutyryl bromide (1.45 mL, 11.7 mmol) in 20 mL of dry CH$_2$Cl$_2$ dropwise over the course of 1 h. Once addition of the 2-bromoisobutyryl bromide solution was complete, the reaction was warmed to room temperature and stirred for an additional 4 h. The solution was then filtered and the filtrate washed three times with water. The organic layer was collected, dried over $MgSO_4$ and concentrated via rotary evaporation to yield a light yellow oil. The crude oil was further purified by column chromatography (20:1 v/v $CH_2Cl_2/CH_3OH$) and subsequent rotary evaporation to yield a viscous, clear, and colorless oil (2.155 g, 7.12 mmol, 60.6% yield).

Representative Synthesis of Poly(Styrene) Macromonomer.

In a dry Schlenk tube, purified styrene (37 mL, 0.323 mol) and N,N,N',N",N"-pentamethyldiethylene triamine (0.675 mL, 3.23 mmol) were degassed by three freeze-pump-thaw cycles. After the third freezing cycle, solid copper(I) bromide (0.460 g, 3.21 mmol) was quickly added under a nitrogen atmosphere and the freeze-pump-thaw cycle was then continued. The reaction mixture was then stirred at 40° C. for 1 h to ensure complete dissolution of the CuBr. 7.4 mL of the solution was transferred via syringe to a second Schlenk tube containing 2 (0.196 g, 0.646 mmol) under nitrogen to give a molar ratio of [Styrene]:[CuBr]:[PMDETA]:[1] of 100:1:1:1. The reaction mixture was placed in an oil bath at 90° C. After 65 min, the Schlenk tube was placed in liquid nitrogen to quench the reaction. The cooled reaction was precipitated in methanol, the supernatant solution was decanted, and the solids were redissolved in $CH_2Cl_2$ and run through a short plug of Brockman Type I basic alumina using $CH_2Cl_2$ as the eluent. The collected eluent was concentrated via rotary evaporation and precipitated a second time in methanol. The solution was decanted and freeze-dried from $C_6H_6$. $M_{n,GPC}$=4.0 kg/mol, $Đ$ (dispersity)=1.09.

Representative Synthesis of Poly(Styrene) Bottlebrush Polymer.

In an argon atmosphere glovebox, poly(styrene) macromonomer (0.1134 g, 2.810×10$^{-5}$ mol) was dissolved in a vial with 1.3 mL of dry toluene and in a second vial Grubbs' 3rd generation catalyst (10.5 mg, 1.208×10$^{-5}$ mol) was dissolved in 1 mL of dry toluene. 34 μL of the Grubbs' catalyst solution was transferred via syringe to the macromonomer solution to give a molar ratio of [macromonomer]:[Grubbs' catalyst] of 80:1. After stirring at room temperature for 8 h, 0.5 mL of ethyl vinyl ether was added to the solution. The solution was precipitated in methanol, decanted and freeze-dried from $C_6H_6$. $M_{n\ bottlebrush,GPC}$=58.4 kg/mol, $Đ$=1.14.

Representative Synthesis of Poly(Styrene-Block-Lactide) Block Copolymer Bottlebrush.

In a nitrogen atmosphere glovebox, poly(styrene) bottlebrush copolymer (47.9 mg, 1.10×10$^{-5}$ mol of —OH units) and lactide (63.7 mg, 4.42×10$^{-4}$ mol) was added to a vial with 1.3 mL of dry toluene. The solution was allowed to stir at room temperature for 1 h prior to adding 1,8-diazabicycloundec-7-ene (0.67 mg, 4.40×10$^{-6}$ mol). After stirring at room temperature for 2.25 h, 1-2 drops of $CH_3COOH$ was added to the solution. The solution was precipitated in methanol, decanted, and dissolved in tetrahydrofuran three times before freeze-drying from $C_6H_6$. $M_{n\ bottlebrush,GPC}$=121.8 kg/mol, $Đ$=1.12, $M_{n\ Lactide,\ NMR}$=5.1 kg/mol, $f_{PLA}$=0.52.

Example 2: Synthesis of a Library of Poly(Styrene-Block-Lactide) Block Copolymer Bottlebrushes Twenty-eight block copolymer bottlebrushes and eight diblock copolymer controls were synthesized according to the procedure described in Example 1. The molecular parameters are shown below in Table 2:

TABLE 2

Molecular Parameters for Block Copolymer Bottlebrushes

| Sample[a] | Polystyrene Bottlebrush Copolymer | | | Block Copolymer Bottlebrush | | | |
|---|---|---|---|---|---|---|---|
| | $N_{n,\ backbone}$[c] | $M_{n,\ bottlebrush}$ (kg/mol)[b] | Dispersity $Đ_{bottlebrush}$[b] | $M_{n,\ PLA}$ (kg/mol)[e] | $M_{n,\ arm\ total}$ (kg/mol)[f] | $N$[g] | $f_{PLA}$[h] |
| SL(3.9, 0.53, 1) | 1[d] | 1.7 | 1.12 | 2.2 | 3.9 | 32 | 0.53 |
| SL(4.2, 0.57, 10) | 10 | 14.5 | 1.17 | 2.5 | 4.2 | 34 | 0.57 |
| SL(4.3, 0.57, 20) | 20 | 19.8 | 1.15 | 2.6 | 4.3 | 34 | 0.57 |
| SL(4.4.0.58, 40) | 40 | 29.2 | 1.22 | 2.7 | 4.4 | 35 | 0.58 |
| SL(4.2, 0.56, 80) | 80 | 72.1 | 1.40 | 2.5 | 4.2 | 33 | 0.56 |
| SL(5.1, 0.54, 1) | 1[d] | 2.2 | 1.10 | 2.9 | 5.1 | 41 | 0.54 |
| SL(5.5, 0.57, 10) | 10 | 15.0 | 1.14 | 3.3 | 5.5 | 44 | 0.57 |
| SL(5.6, 0.57, 20) | 20 | 22.3 | 1.15 | 3.4 | 5.6 | 45 | 0.57 |
| SL(5.6, 0.57, 40) | 40 | 53.5 | 1.25 | 3.4 | 5.6 | 45 | 0.57 |
| SL(5.6, 0.57, 80) | 80 | 88.4 | 1.38 | 3.4 | 5.6 | 45 | 0.57 |
| SL(5.9, 0.53, 1) | 1[d] | 2.6 | 1.13 | 3.4 | 5.9 | 48 | 0.53 |
| SL(5.9, 0.53, 10) | 10 | 19.6 | 1.22 | 3.4 | 5.9 | 48 | 0.53 |
| SL(6.0, 0.54, 20) | 20 | 29.3 | 1.21 | 3.5 | 6.0 | 49 | 0.54 |
| SL(5.8, 0.53, 40) | 40 | 41.4 | 1.29 | 3.3 | 5.8 | 47 | 0.53 |
| SL(5.6, 0.51, 80) | 80 | 97.4 | 1.57 | 3.0 | 5.6 | 46 | 0.51 |
| SL(7.8, 0.53, 1) | 1[d] | 3.4 | 1.10 | 4.4 | 7.8 | 64 | 0.53 |
| SL(7.7, 0.52, 10) | 10 | 23.4 | 1.11 | 4.3 | 7.7 | 63 | 0.52 |
| SL(7.8, 0.52, 10) | 20 | 38.0 | 1.15 | 4.5 | 7.8 | 64 | 0.53 |
| SL(8.2, 0.55, 40) | 40 | 63.9 | 1.27 | 4.9 | 8.2 | 67 | 0.55 |
| SL(7.8, 0.53, 80) | 80 | 118.7 | 1.37 | 4.5 | 7.8 | 64 | 0.53 |
| SL(8.6, 0.53, 1) | 1[d] | 4.0 | 1.09 | 4.6 | 8.6 | 71 | 0.50 |
| SL(8.7, 0.50, 10) | 10 | 23.4 | 1.11 | 4.7 | 8.9 | 71 | 0.50 |
| SL(9.1, 0.53, 20) | 20 | 33.4 | 1.10 | 5.2 | 9.1 | 75 | 0.53 |
| SL(8.9, 0.51, 40) | 40 | 45.9 | 1.13 | 4.9 | 8.9 | 73 | 0.51 |
| SL(9.1, 0.52, 80) | 80 | 58.4 | 1.14 | 5.1 | 9.1 | 75 | 0.52 |
| SL(10.6, 0.50, 1) | 1[d] | 4.9 | 1.11 | 5.7 | 10.6 | 87 | 0.50 |
| SL(10.3, 0.49, 10) | 10 | 43.3[i] | 1.29 | 5.4 | 10.3 | 84 | 0.49 |

TABLE 2-continued

Molecular Parameters for Block Copolymer Bottlebrushes

| | | Polystyrene Bottlebrush Copolymer | | Block Copolymer Bottlebrush | | | |
|---|---|---|---|---|---|---|---|
| Sample[a] | $N_{n, backbone}$[c] | $M_{n, bottlebrush}$ (kg/mol)[b] | Dispersity $Đ_{bottlebrush}$[b] | $M_{n, PLA}$ (kg/mol)[e] | $M_{n, arm\ total}$ (kg/mol)[f] | N[g] | $f_{PLA}$[h] |
| SL(10.8, 0.51, 20) | 20 | 59.4[i] | 1.36 | 5.9 | 10.8 | 88 | 0.51 |
| SL(11.1, 0.52, 40) | 40 | 92.2[i] | 1.50 | 6.1 | 11.1 | 89 | 0.52 |
| SL(11.0, 0.51, 80) | 80 | 123.5[i] | 1.66 | 6.0 | 11.0 | 89 | 0.51 |
| SL(12.3, 0.51, 1) | 1[d] | 5.6 | 1.08 | 6.7 | 12.3 | 100 | 0.51 |
| SL(12.3, 0.51, 10) | 10 | 49.5 | 1.15 | 6.7 | 12.3 | 100 | 0.51 |
| SL(12.4, 0.51, 20) | 20 | 58.2 | 1.17 | 6.8 | 12.4 | 101 | 0.51 |
| SL(12.6, 0.52, 40) | 40 | 80.4 | 1.24 | 7.0 | 12.6 | 103 | 0.52 |
| SL(12.4, 0.51, 80) | 80 | 91.2 | 1.28 | 6.8 | 12.4 | 101 | 0.51 |

[a]SL(X, Y, Z) = Styrene-Lactide with total molecular weight (X, kg/mol), $f_{PLA}$ (Y) and $N_{n, backbone}$ (Z).
[b]$M_n$ and $Đ$ determined be SEC in THF at 40° C. versus PS standards. Dispersity $Đ = M_w/M_n$, where $M_w$ = weight average molecular weight and $M_n$ = number average molecular weight.
[c]$N_{n, backbone}$ determine from [macromonomer]:[Grubb's Catalyst] during ROMP.
[d]ROMP was not performed on macromonomer in order to make a poly(styrene-block-lactide) diblock copolymer control.
[e]$M_n$ of PLA determined from $^1$H NMR analysis based on the molecular weight of the polystyrene macromonomer.
[f]$M_{n, total} = M_{n, PLA}$ from $^1$H NMR + $M_{n, PS}$ from SEC.
[g]Segment density-normalized degree of polymerization calculated from molecular weight, density at 110° C. ($ρ_{PS}$ = 1.02 g/cm$^3$ and $ρ_{PLA}$ = 1.18 g/cm$^3$) and a reference volume of 185 Å$^3$ with $N = N_{n, PLA} + N_{n, PS}$.
[h]$f_{PLA} = N_{n, PLA}/N_{n, PLA} + N_{n, PS}$.
[i]High molecular weight shoulder present in SEC trace.

Example 3: Fabrication of Non-Preferential Substrate and Block Copolymer Bottlebrush Self-Assembly into Perpendicular Orientation A 0.3 wt % (w/w) solution of poly(styrene-r-methyl methacrylate-r-glycidyl methacrylate) random copolymer with $f_{styrene}$=0.51 in toluene was spin-coated at 4000 rpm onto a precleaned silicon wafer and annealed at 220° C. for 15 minutes followed by washing with toluene to remove ungrafted chains. A 0.5 wt % (w/w) solution of SL(12.4, 0.51,80) was then spin-coated onto this random-copolymer modified wafer at 4000 rpm to create a 12 nm thick block copolymer bottlebrush film and annealed under vacuum at 120° C. for 4 h. block copolymer bottlebrush film thickness was measured by ellipsometry (Rudolf Research Auto EL). Top-down scanning electron micrographs of the thin film morphology were acquired with a LEO-1550 VP field-emission SEM operating with an accelerating voltage of 1 kV.

Example 4: Synthesis of a Library of Poly(Styrene-Block-Lactide) Block Copolymer Bottlebrushes The below scheme was used to synthesize asymmetric PS-b-PLA block copolymer bottlebrushes.

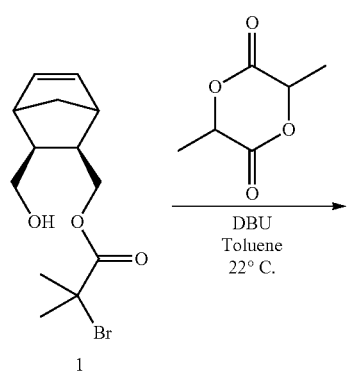

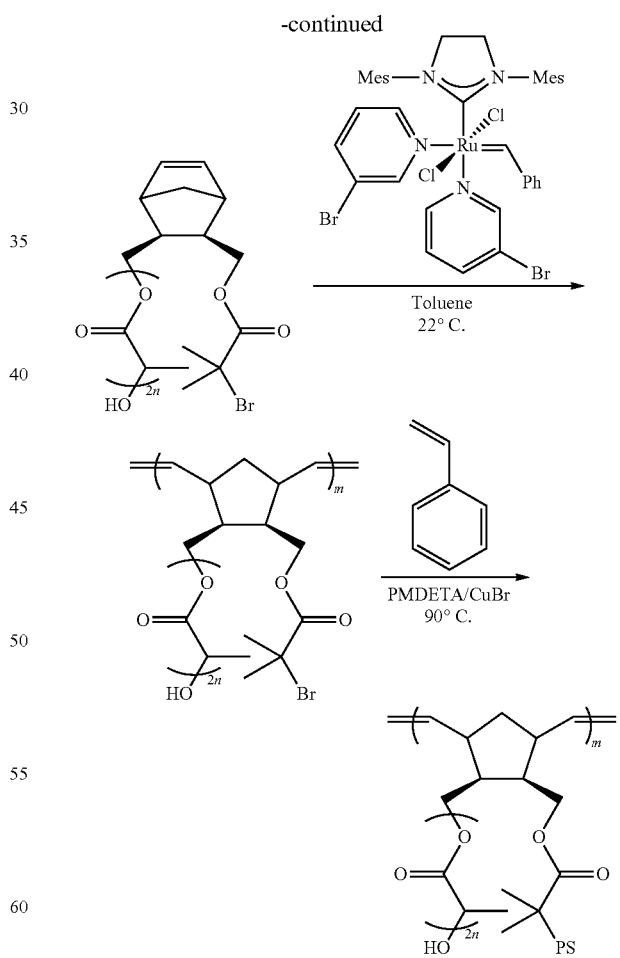

Using 1 as an initiator and DBU as a catalyst, ring-opening transesterification polymerization (ROTEP) of lactide was performed to produce 2-bromoisobutyrloxymethylnorbornene-terminated PLA macromonomers. PLA macromonomers were subsequently polymerized via ROMP at 25° C. with [MM]=0.025 M in toluene using Grubbs' 3$^{rd}$ generation catalyst. Within this polymerization the backbone degree of polymerization (N$_{Backbone}$) was controlled and, taking into account the residual un-functionalized PLA homopolymer, assigned as the ratio of [2-bromoisobutyr-loxymethylnorbornene-terminated PLA macromonomers]:[Grubbs' catalyst] in solution. After the polymerization was run to completion, an initial aliquot of the product prior to workup was taken and analyzed via $^1$H NMR and SEC. Within the $^1$H NMR spectra, no residual vinylic norbornene protons of the PLA macromonomer were observed, thus confirming that the reaction completely consumed all 2-bromoisobutyrloxymethylnorbornene-terminated PLA macromonomers. SEC traces revealed as expected a unimodal, narrow dispersity low retention volume PLA bottlebrush copolymer signal along with a high retention volume signal correlated with the residual PLA homopolymer. In order to remove this residual homopolymer, the rest of the solution was worked up in a manner that fractionated out PLA homopolymer. Finally, ATRP of styrene was performed using the pendant tertiary bromides off the backbone of the PLA bottlebrush copolymer as an initiator source. In order to mitigate intra and inter molecular coupling during the ATRP, the reactions were run at high [monomer]:[initiator] ratios (~1000:1) and low conversions (~4-18% conversion). In order to also decrease the concentration of radicals in solution and mitigate pre-equilibrium coupling, CuBr$_2$ was also added to the solution so that [CuBr]:[CuBr$_2$]=95:5. After the polymerization was complete, $^1$H NMR was used to determine molecular weight and SEC analysis revealed a RI signal of low dispersity with a slight shoulder at low retention volume indicative of intermolecular coupling of bottlebrush copolymers. To additionally confirm the characterization of the PS-b-PLA block copolymer bottlebrushes after ATRP, a polymer, SL(17.0,0.31,20), was etched under caustic conditions and the resulting PS homopolymer isolated. SEC analysis of this homopolymer produced a unimodal, low dispersity trace (Đ =1.11) with an M$_{n,PS}$=9.5 kg/mol (Figure A3.2). The similarity in molecular weights between $^1$H NMR and SEC characterization (M$_{n,SEC}$=9.5 kg/mol VS. M$_{n,NMR}$=11.2 kg/mol) along with the low dispersity of the PS homopolymer confirms that the initiation from the pendant tertiary bromides occurs evenly and efficiently at all the sites along the backbone. Using this synthetic route, 10 unique asymmetric PS-b-PLA block copolymer bottlebrushes along with 4 diblock copolymer controls were synthesized with N$_{backbone}$=1, 20, 80, M$_{n,arm}$=7.2-23.2 kg/mol and f$_{PLA}$=0.16-0.42. The molecular parameters of each sample are provided below in Table 3. As above, each sample is labeled as SL(X,Y,Z) for Styrene-Lactide with total arm molecular weights relative to the comparable diblock copolymer (X kg/mol), f$_{PLA}$ (Y), and N$_{backbone}$ (Z). Diblock copolymer controls were synthesized by omitting the ROMP step in the synthetic route and directly performing ATRP with the PLA macromonomers and are referred to as having an N$_{backbone}$=1.

TABLE 3

Molecular Parameters for Asymmetric Block Copolymer Bottlebrushes

| | Polylactide Macromonomer | | Polylactide Bottlebrush Copolymer | | PS-b-PLA Block Copolymer Bottlebrush | | |
|---|---|---|---|---|---|---|---|
| Sample[a] | M$_{n,PLA}$ (kg/mol)[c] | Đ$_{PLA}$[c] | N$_{backbone}$[d] | Đ$_{bottlebrush}$[f] | M$_{n,PS}$ (kg/mol)[g] | M$_{n,arm\ total}$ (kg/mol)[h] | f$_{PLA}$[i] |
| SL(23.2, 0.16, 80) | 4.2 | 1.13 | 80 | 1.16 | 19.0 | 23.2 | 0.16 |
| SL(18.3, 0.23, 80) | 4.7 | 1.10 | 80 | 1.21 | 13.6 | 18.3 | 0.23 |
| SL(15.5, 0.24, 80) | 4.2 | 1.13 | 80 | 1.16 | 11.3 | 15.5 | 0.24 |
| SL(9.7, 0.40, 80) | 4.2 | 1.13 | 80 | 1.16 | 5.5 | 9.7 | 0.40 |
| SL(5.6, 0.51, 80)[b] | 3.0 | — | 80 | 1.57 | 2.6 | 5.6 | 0.51 |
| SL(14.9, 0.23, 20) | 3.9 | 1.14 | 20 | 1.09 | 11.0 | 14.9 | 0.23 |
| SL(10.7, 0.27, 20) | 3.3 | 1.13 | 20 | 1.12 | 7.5 | 10.7 | 0.27 |
| SL(12.0, 0.29, 20) | 3.9 | 1.14 | 20 | 1.09 | 8.1 | 12.0 | 0.29 |
| SL(17.0, 0.31, 20) | 5.8 | 1.13 | 20 | 1.07 | 11.2 | 17.0 | 0.31 |
| SL(10.4, 0.34, 20) | 3.9 | 1.14 | 20 | 1.09 | 6.5 | 10.4 | 0.34 |
| SL(7.2, 0.42, 20) | 3.3 | 1.13 | 20 | 1.12 | 3.9 | 7.2 | 0.42 |
| SL(6.0, 0.54, 20)[b] | 3.4 | — | 20 | 1.21 | 2.6 | 6.0 | 0.54 |
| SL(20.6, 0.18, 1) | 4.2 | 1.13 | 1[e] | — | 16.3 | 20.6 | 0.18 |
| SL(20.2, 0.26, 1) | 5.8 | 1.10 | 1[e] | — | 14.4 | 20.2 | 0.26 |
| SL(13.6, 0.28, 1) | 4.2 | 1.13 | 1[e] | — | 9.4 | 13.6 | 0.28 |
| SL(9.7, 0.40, 1) | 4.2 | 1.13 | 1[e] | — | 5.5 | 9.7 | 0.40 |
| SL(10.6, 0.50, 1)[b] | 5.7 | — | 1[e] | — | 4.9 | 10.6 | 0.50 |

[a]SL(X, Y, Z) = Styrene-Lactide with total molecular weight (X, kg/mol), f$_{PLA}$ (Y) and N$_{n,\ backbone}$ (Z).
[b]Molecular parameters and microphase separation behavior reproduced from Chapter 2.
[c]M$_n$ and Đ determined be SEC in THF at 40° C. using a Mark-Houwink corrected calibration curve for PLA.
[d]N$_{backbone}$ determine from [MM]:[Grubb's Catalyst] during ROMP.
[e]ROMP was not performed on macromonomer in order to make a PS-b-PLA diblock copolymer control.
[f]Đ determined by SEC in THF at 40° C. using a PS Standards calibration curve.
[g]M$_n$ of PS determined from $^1$H NMR analysis based on the molecular weight of the PLA macromonomer.
[h]M$_{n,\ total}$ = M$_{n,\ PLA}$ from SEC + M$_{n,\ PS}$ from $^1$H NMR.
[i]f$_{PLA}$ = N$_{n,\ PLA}$/(N$_{n,\ PLA}$ + N$_{n,\ PS}$).

Example 5: Microphase Separation Behavior of Block Copolymer Bottlebrushes

Temperature-dependent SAXS was used to determine the order disorder-transition temperatures (T$_{ODT}$) of the asymmetric samples. With the known segmental interaction parameter represented in Equation (1) above, temperature-dependent SAXS was used to calculate the critical (χN$_{arm}$)$_{ODT}$ for microphase separation in block copolymer bottlebrushes that formed the hexagonally-packed cylinders morphology. Results are provided in Table 4.

TABLE 4

Microphase Separation Behavior of Block Copolymer Bottlebrushes

| Sample | $N_{arm}{}^b$ | $f_{PLA}$ | Morphology$^c$ | d (nm)$^c$ | $T_{ODT}$ (° C.)$^e$ | $(\chi N)_{ODT}{}^j$ |
|---|---|---|---|---|---|---|
| SL(23.2, 0.16, 80) | 199 | 0.16 | Sph./Hex.$^d$ | 15.6 | 180$^i$ | 20.8 |
| SL(18.3, 0.23, 80) | 156 | 0.23 | Hex. | 22.1 | — | — |
| SL(15.5, 0.24, 80) | 131 | 0.24 | Hex. | 15.1 | 180$^i$ | 13.7 |
| SL(9.7, 0.40, 80) | 80 | 0.40 | Lam. | 13.1 | 170 | 8.8 |
| SL(5.6, 0.51, 80)$^a$ | 46 | 0.51 | Lam. | 11.8 | 185$^i$ | 4.7 |
| SL(14.9, 0.23, 20) | 127 | 0.23 | Dis. | — | — | — |
| SL(10.7, 0.27, 20) | 90 | 0.27 | Lam. | 13.0 | 135 | 11.6 |
| SL(12.0, 0.29, 20) | 101 | 0.29 | Hex. | 14.1 | 180$^i$ | 10.6 |
| SL(17.0, 0.31, 20) | 143 | 0.31 | Hex. | 21.7 | — | — |
| SL(10.4, 0.34, 20) | 87 | 0.34 | Dis. | — | — | — |
| SL(7.2, 0.42, 20) | 59 | 0.42 | Dis. | — | — | — |
| SL(6.0, 0.54, 20)$^a$ | 49 | 0.54 | Lam. | 11.7 | 150 | 5.8 |
| SL(20.6, 0.18, 1) | 176 | 0.18 | Dis. | — | — | — |
| SL(20.2, 0.26, 1) | 176 | 0.26 | Hex. | 18.3 | — | — |
| SL(13.6, 0.28, 1) | 115 | 0.28 | Dis. | — | — | — |
| SL(9.7, 0.40, 1) | 80 | 0.40 | Dis. | — | — | — |
| SL(10.6, 0.50, 1)$^a$ | 87 | 0.50 | Lam. | 12.9 | 125 | 11.6 |

$^a$Molecular parameters and microphase separation behavior from Table 2.
$^b$Segment density normalized degree of polymerization calculated using the density of each polymer at 110° C. ($\rho_{PS}$ = 1.02 g/cm$^3$ and $\rho_{PLA}$ = 1.18 g/cm$^3$) and a reference volume of 185 Å$^3$ with $N_{arm} = N_{n, PLA} + N_{n, PS}$.
$^c$Derived from SAXS patterns.
$^d$Unable to definitively assign morphology from SAXS traces.
$^e$T$_{ODT}$ was assigned via temperature dependent SAXS.
$^i$No accessible T$_{ODT}$ due to sample degradation above 185° C.
$^j(\chi N)_{ODT}$ calculated using previously reported experimental temperature-dependent χ values.

Example 6: Microdomain Periodicities of Asymmetric Block Copolymer Bottlebrushes By going from linear diblock copolymers to block copolymer bottlebrushes, the periodicity of the microphase separated morphology slightly increases at comparable arm molecular weights. For instance, going from the linear diblock copolymer SL(20.2,0.26,1) to block copolymer bottlebrushes SL(17.0,0.31,20) and SL(18.3,0.23,80) dilate periodic spacings to $d_{c-c}$=21.7 nm and 22.1 nm respectively. This domain dilation is also observed in symmetric block copolymer bottlebrushes and is believed to occur from the copolymer chains being more stretched by virtue of the dense grafting along the poly(cyclopentenamer) backbone.

Analysis of block copolymer bottlebrush periodicity at varying $M_{n, arm}$ and $N_{backbone}$=20 reveals that these periodicities are significantly dependent on molecular weight. By decreasing the $M_{n\ arm}$ of SL(17.0,0.31,20) at similar $f_{PLA}$, SAXS of SL(12.0, 0.29, 20) shows a periodic $d_{c-c}$=14.1 nm while SL(10.7, 0.27, 20) has a periodic $d_{c-c}$=13.0 nm.

The self-assembly behavior of block copolymer bottlebrushes as a function of backbone length against the parameters of the self-assembled hexagonally-packed cylinders morphology was further analyzed. For a hexagonally-packed cylinders morphology the radius of each cylinder can be calculated using the relation of:

$$f_{cylinder} = \frac{3\pi r^2}{3\sqrt{3}/2(d_{c-c})^2} \quad (11)$$

where $f_{cylinder}$ in the above samples is the experimentally determined volume fraction of PLA and r is the radius of the cylinders. Rearranging equation 11 and solving for the circumference instead of the radius gives:

$$C_{cylinder} = 4\pi\sqrt{\frac{2\sqrt{3}\,\pi f_{PLA}}{3(q^*)^2}} \quad (12)$$

where $C_{cylinder}$ is the circumference of each cylinder and q* is the position of the principal scattering peak from SAXS studies. The length of a fully stretched backbone can be calculated as:

$$L_{backbone} = nl \quad (13)$$

where n is the backbone degree of polymerization derived from the [MM]:[Grubb's Catalyst] used during the ROMP and l is the length of a backbone repeat unit, which for the product of a ROMP of a norbornene is 6.49 Å. Solving equations 12 and 13 for SL(17.0,0.31,20) shows that microphase separation of this sample produces a hexagonally-packed cylinders morphology where the circumference of the cylinder ($C_{cylinder, SL(17.0,0.31,20)}$=40.2 nm) is much greater than the length of a fully stretched backbone ($L_{backbone,\ SL(17.0,0.31,20)}$=13.0 nm). In contrast, solving these equations for SL(18.3,0.23,80), reveals the opposite relationship between the circumference of the cylinder ($C_{cylinder, SL(18.3,23,80)}$=34.9 nm) and the length of a fully stretched backbone ($L_{backbone,\ SL(18.3,0.23,80)}$=51.9 nm).

Example 7: Thin Film Behavior of an Asymmetric Block Copolymer Bottlebrush Material The thin film behavior of SL(17.0,0.31,20) under thermal annealing as a function of chemically modified poly(styrene-ran-methyl methacrylate-ran-glycidyl methacrylate) (PS-r-PMMA-r-PGMA) surfaces and film thickness was studied via SEM. FIGS. 8B and 8C shows SEM images of select samples, showing perpendicular orientation (FIG. 8B) on a PS-r-PMMA-r-PGMA modified substrate with $F_{PS}$=0.57 and $F_{PGMA}$=0.05 with a film thickness of 13.9 nm along with the parallel orientation (FIG. 8C) on a bare silicon substrate and a film thickness of 18.7 nm. Furthermore, 2D Grazing-Incidence Small Angle X-ray Scattering (GISAXS) patterns also confirmed that the orientation of the films persisted over large areas of the sample. Line integration of these 2D patterns along the $q_y$ axis confirmed both orientations retain similar $d_{c-c}$ spacing as in bulk ($d_{c-c,bulk}$=21.7 nm, $d_{c-c,perpendicular}$=21.4 nm, $d_{c-c,\ parallel}$=22.8 nm) and that the perpendicular orientation retains a hexagonally-packed cylinders morphology. It was also observed that perpendicular orientation was most readily produced at film thicknesses of about 14 nm, which is approximately the length of the backbone in SL(17.0,0.31,20). This further indicates that the backbone of the block copolymer bottlebrushes are located parallel to the c-axis and that the backbone length is a factor in the thin films self-assembly behavior.

Although the foregoing invention has been described in some detail for purposes of clarity of understanding, it will be apparent that certain changes and modifications may be practiced within the scope of the invention. It should be noted that there are many alternative ways of implementing both the process and compositions of the present invention. Accordingly, the present embodiments are to be considered as illustrative and not restrictive, and the invention is not to be limited to the details given herein.

The invention claimed is:
1. A composition comprising:
   a material comprising a block copolymer bottlebrush, wherein the block copolymer bottlebrush comprises a backbone and a plurality of $A_nB_m$ block copolymers, with $n \geq 1$ and $m \geq 1$, wherein each of the plurality of $A_nB_m$ block copolymers comprises at least one block of an A polymer joined at an A-B junction to at least one block of a B polymer and is covalently linked to the backbone at the A-B junction, and wherein the material is microphase-separated into periodic domains of the A polymer and the B polymer.

2. The composition of claim 1, wherein the domain size is smaller than the minimum domain size of an AB diblock copolymer material that is microphase separated into periodic domains of the A polymer and the B polymer, the AB diblock copolymer material comprising a plurality of AB diblock copolymers, each of which comprises one block of the A polymer and one block of the B polymer, that are not linked to a backbone.

3. The composition of claim 2, wherein the domain size is at least 25% smaller than the minimum domain size of the AB diblock copolymer material.

4. The composition of claim 1, wherein the material is in a thin film.

5. The composition of claim 1, wherein material is a bulk-phase material.

6. The composition of claim 1, further comprising a substrate underlying the material, wherein the periodic domains are oriented perpendicular to the substrate.

7. The composition of claim 1, wherein the $A_nB_m$ block copolymers are symmetric AB diblock copolymers.

8. The composition of claim 1, wherein the $A_nB_m$ block copolymers are asymmetric AB diblock copolymers.

9. The composition of claim 1, wherein the $A_nB_m$ block copolymers are $A_2B$ block copolymers.

10. The composition of claim 1, wherein the $A_nB_m$ block copolymers are $A_2B_2$ block copolymers.

11. A composition comprising:
a microphase-separated block copolymer material comprising a plurality of AB diblock copolymers, each of which comprises one block of an A polymer and one block of a B polymer, characterized by the segmental interaction parameter $\chi_{AB}$, wherein the AB diblock copolymers in the microphase-separated block copolymer material have an average degree of polymerization $N_n$ such that $\chi_{AB}N_n$ is less than 7.5, and wherein the microphase-separated block copolymer material is microphase-separated into periodic domains of the A polymer and the B polymer.

12. The composition of claim 11, wherein the AB diblock copolymers in the microphase-separated material have an average degree of polymerization $N_n$ such that $\chi_{AB}N_n$ is less than 5.

13. The composition of claim 11, wherein the AB diblock copolymers in the microphase-separated material have an average degree of polymerization $N_n$ such that $\chi_{AB}N_n$ is less than 4.

14. A composition comprising:
a microphase-separated block copolymer material comprising a plurality of AB diblock copolymers, each of which comprises one block of an A polymer and one block of a B polymer, characterized by the segmental interaction parameter $\chi_{AB}$ and wherein the AB diblock copolymers in the microphase-separated material are microphase-separated into periodic lamellae having a lamellar spacing of less than $3.8 \times 1.096 a_{AB} \chi^{-1/2}$.

15. The composition of claim 14, wherein the periodic lamellae in the microphase-separated material have a lamellar spacing of less than $3 \times 1.096 a_{AB} \chi^{-1/2}$.

* * * * *